(12) United States Patent
Oh et al.

(10) Patent No.: US 11,956,542 B2
(45) Date of Patent: Apr. 9, 2024

(54) ACTUATOR CONTROL APPARATUS AND METHOD FOR CHANGING AN OPTICAL PATH OF A LENS

(71) Applicant: LG INNOTEK CO., LTD., Seoul (KR)

(72) Inventors: Jun Seok Oh, Seoul (KR); Min Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 335 days.

(21) Appl. No.: 17/420,450

(22) PCT Filed: Jan. 2, 2020

(86) PCT No.: PCT/KR2020/000052
§ 371 (c)(1),
(2) Date: Jul. 2, 2021

(87) PCT Pub. No.: WO2020/141901
PCT Pub. Date: Jul. 9, 2020

(65) Prior Publication Data
US 2022/0086351 A1   Mar. 17, 2022

(30) Foreign Application Priority Data

Jan. 4, 2019 (KR) .......................... 10-2019-0001218
May 7, 2019 (KR) .......................... 10-2019-0052971

(51) Int. Cl.
*H04N 5/335* (2011.01)
*G02B 7/09* (2021.01)
(Continued)

(52) U.S. Cl.
CPC ............. *H04N 23/687* (2023.01); *G02B 7/09* (2013.01); *G03B 5/02* (2013.01); *G03B 17/12* (2013.01); *G03B 2205/0069* (2013.01)

(58) Field of Classification Search
CPC .......................... G02B 5/02; G03B 2205/0069
See application file for complete search history.

(56) References Cited

U.S. PATENT DOCUMENTS

| 2006/0064884 A1* | 3/2006 | Seo .......................... H04N 23/68 |
| | | 348/E5.046 |
| 2009/0128928 A1* | 5/2009 | Ito .......................... G02B 7/102 |
| | | 310/38 |

(Continued)

FOREIGN PATENT DOCUMENTS

| CN | 102053451 A | 5/2011 |
| CN | 103178331 A | 6/2013 |

(Continued)

*Primary Examiner* — Gary C Vieaux
(74) *Attorney, Agent, or Firm* — Birch, Stewart, Kolasch & Birch, LLP

(57) ABSTRACT

According to an embodiment of the present invention, an actuator control apparatus comprises: an actuator changing an optical path of a lens; and a controller controlling the actuator, wherein the actuator comprises a first driver and a second driver which are arranged on a first side of a lens support member, and a third driver and a fourth driver which are arranged on a second side of the lens support member. A first distance between the first driver and the second driver is different from a second distance between the first driver and the third driver, and the first driver and the fourth driver are located in a diagonal direction with respect to each other. The controller applies a first current to the second driver and the third driver and applies a second current to the first driver and the fourth driver. When the lens is moved in a diagonal direction, an absolute value of the first current is different from an absolute value of the second current.

19 Claims, 19 Drawing Sheets

(51) Int. Cl.
*G03B 5/02* (2021.01)
*G03B 17/12* (2021.01)
*H04N 23/68* (2023.01)

(56) References Cited

U.S. PATENT DOCUMENTS

| | | |
|---|---|---|
| 2009/0201381 A1 | 8/2009 | Byon et al. |
| 2011/0103781 A1* | 5/2011 | Bang .................. H02K 41/0356 396/55 |
| 2014/0071545 A1 | 3/2014 | Sumioka |
| 2016/0306269 A1 | 10/2016 | Gyoten et al. |
| 2018/0246341 A1 | 8/2018 | Jung et al. |

FOREIGN PATENT DOCUMENTS

| | | |
|---|---|---|
| CN | 108303284 A | 1/2017 |
| JP | 2014-67016 A | 4/2014 |
| JP | 2015-1728 A | 1/2015 |
| JP | 6432744 B2 | 12/2018 |
| KR | 10-2011-0047541 A | 5/2011 |
| KR | 10-2018-0024145 A | 3/2018 |
| KR | 10-2018-0099513 A | 9/2018 |

* cited by examiner

[FIG. 1]
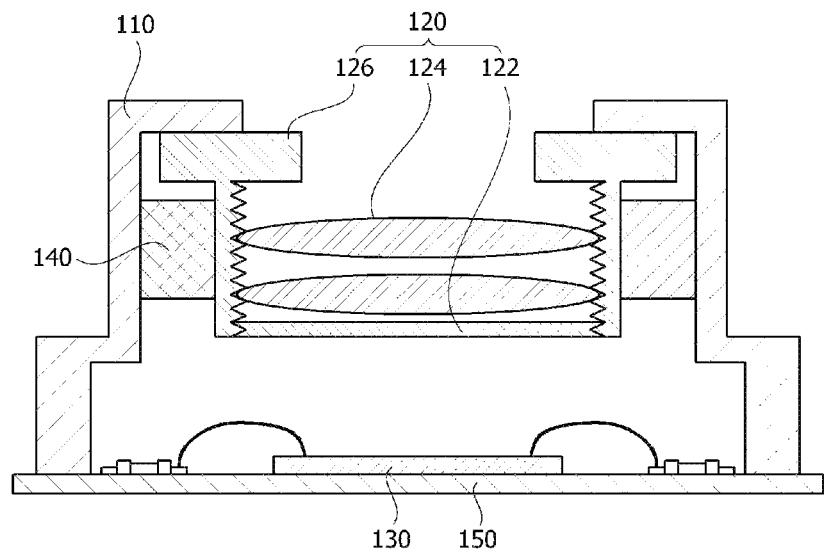
[FIG. 2]
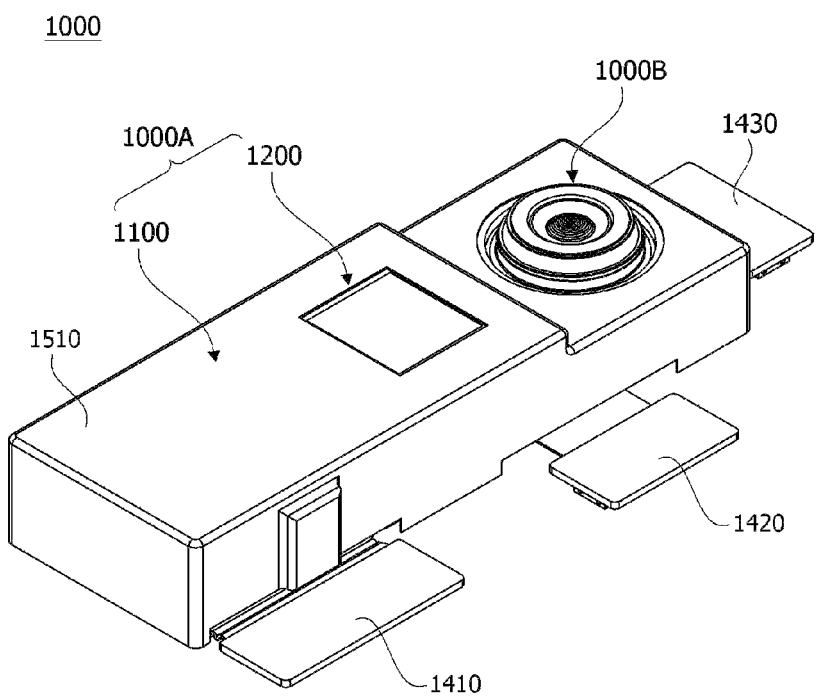

[FIG. 3A]
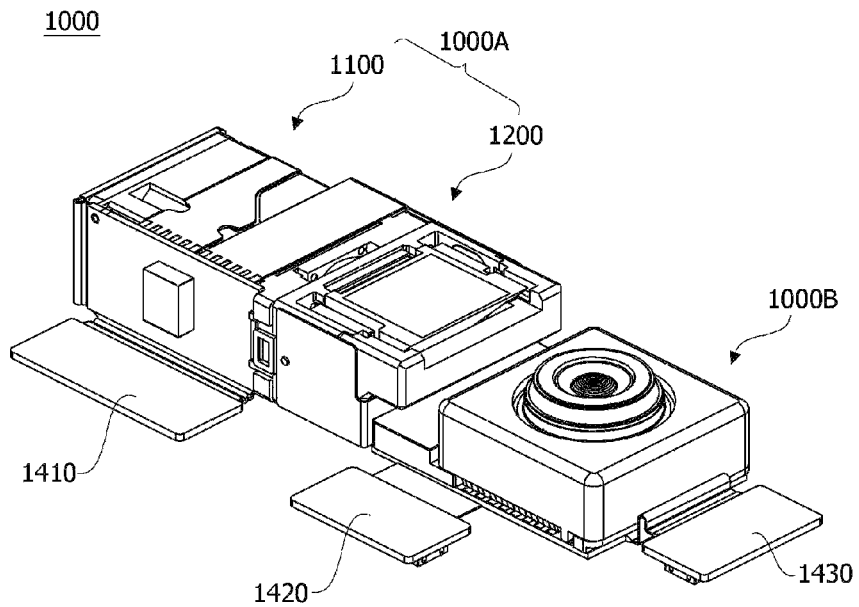
[FIG. 3B]
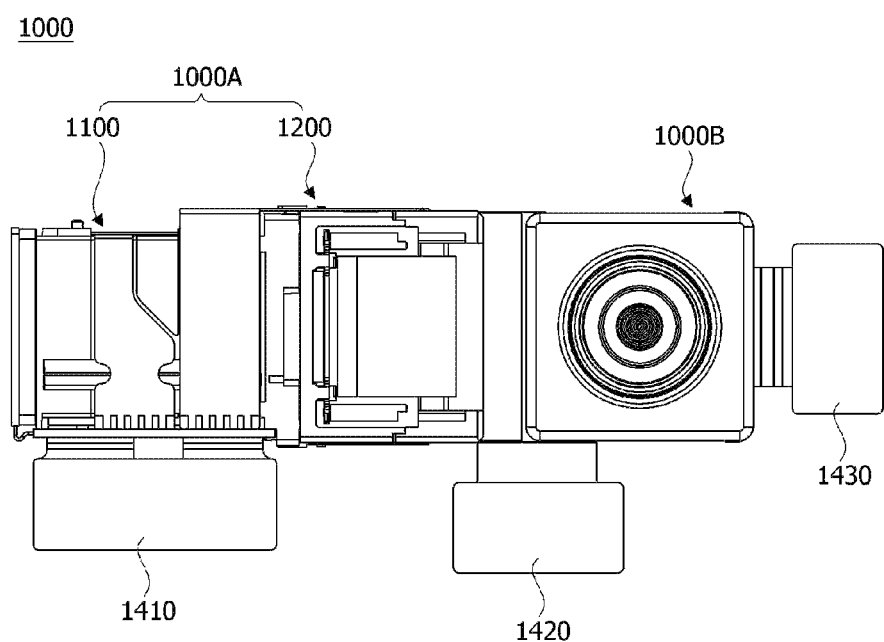

[FIG. 4A]
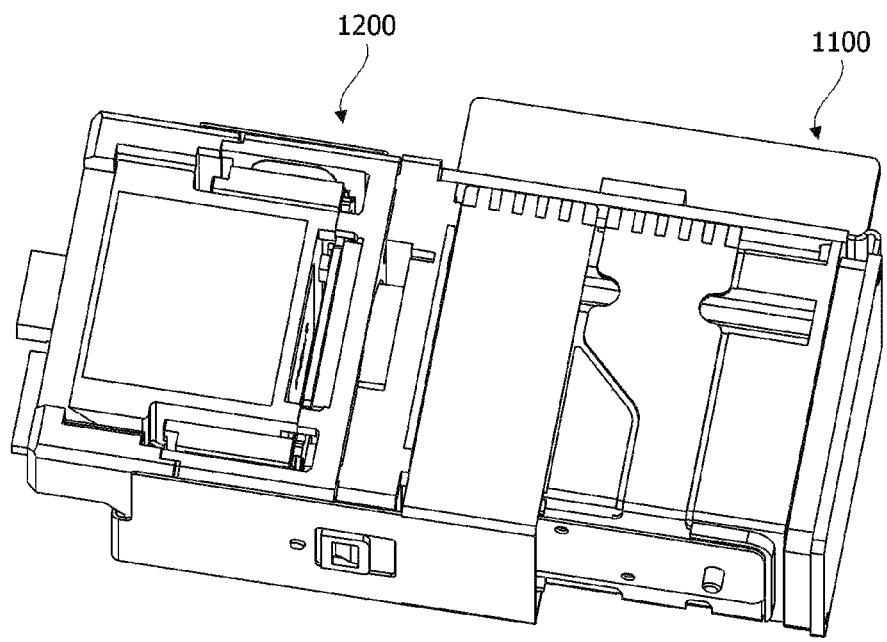

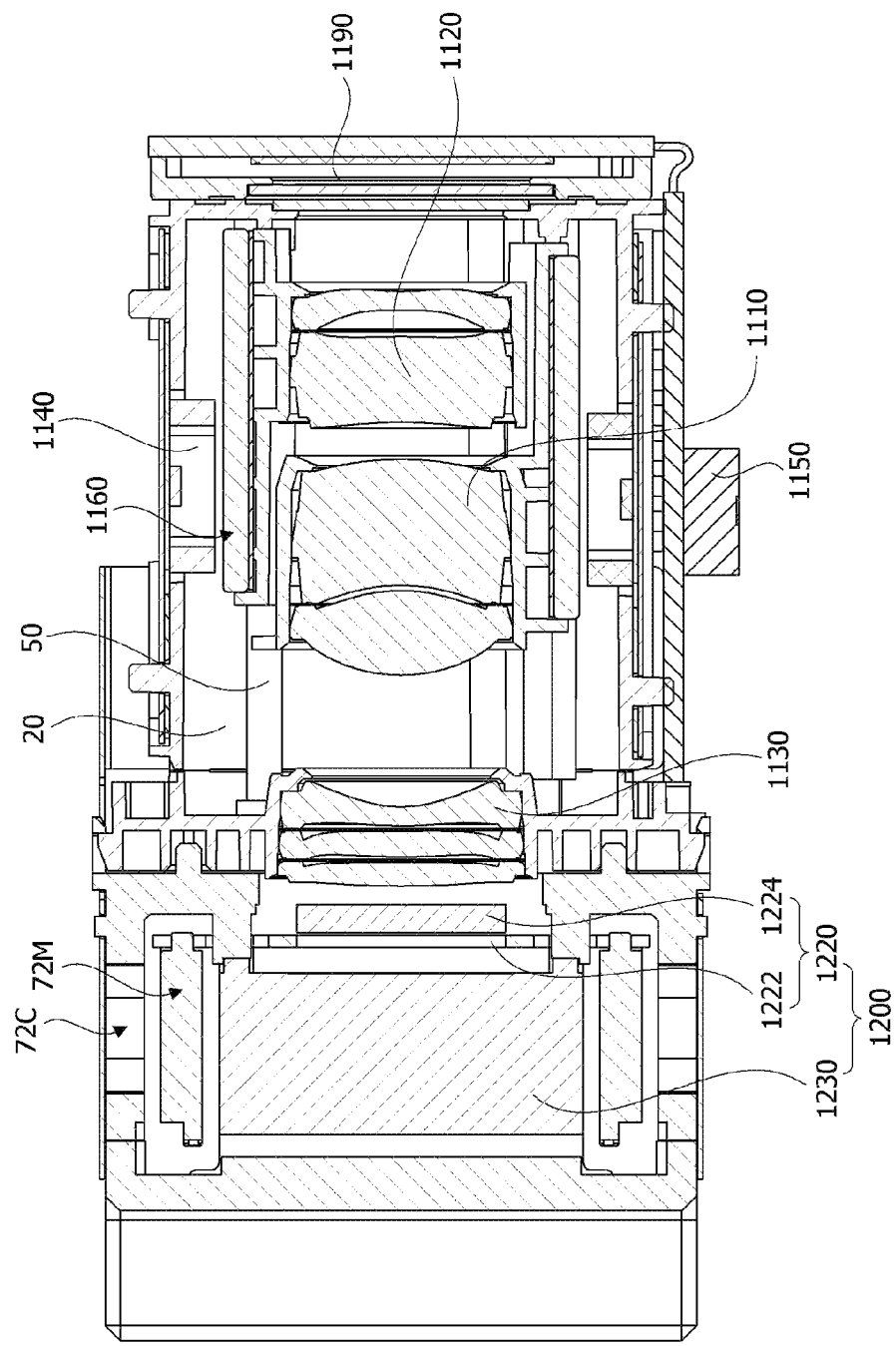
[FIG. 4B]

[FIG. 5A]
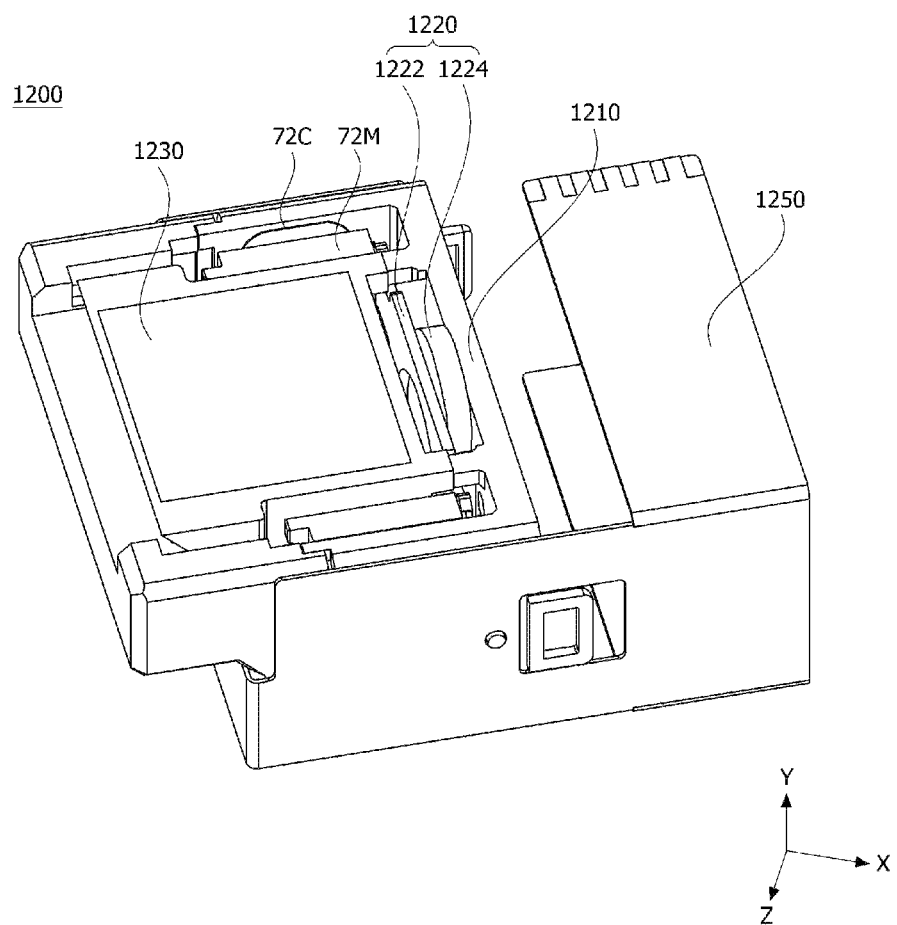

[FIG. 5B]
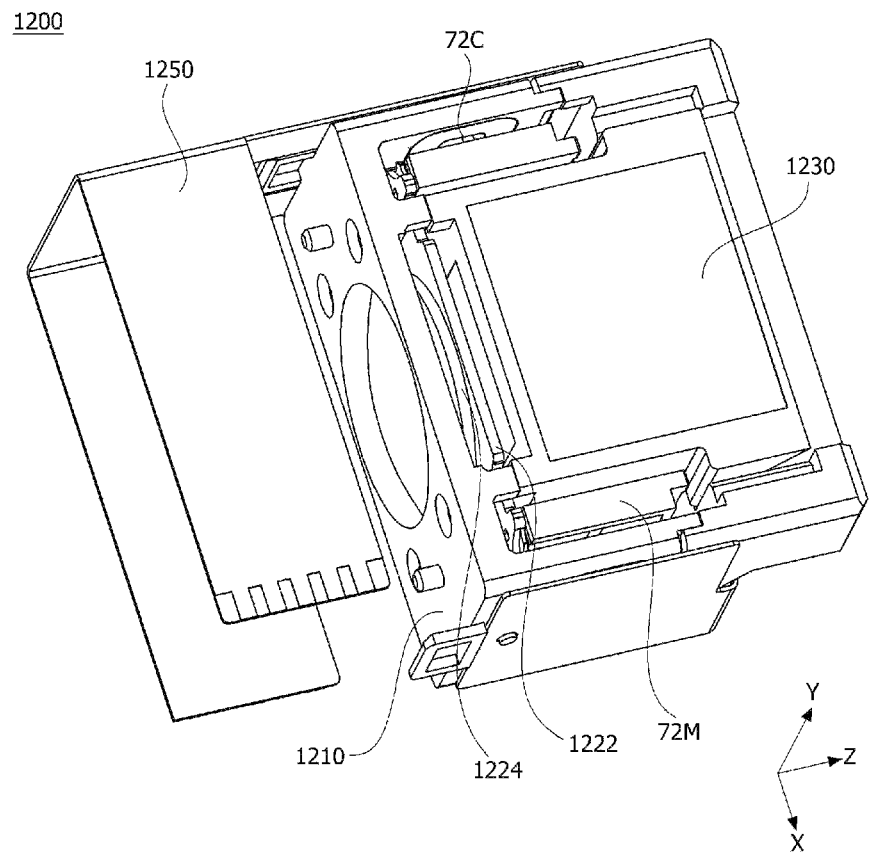

[FIG. 6A]
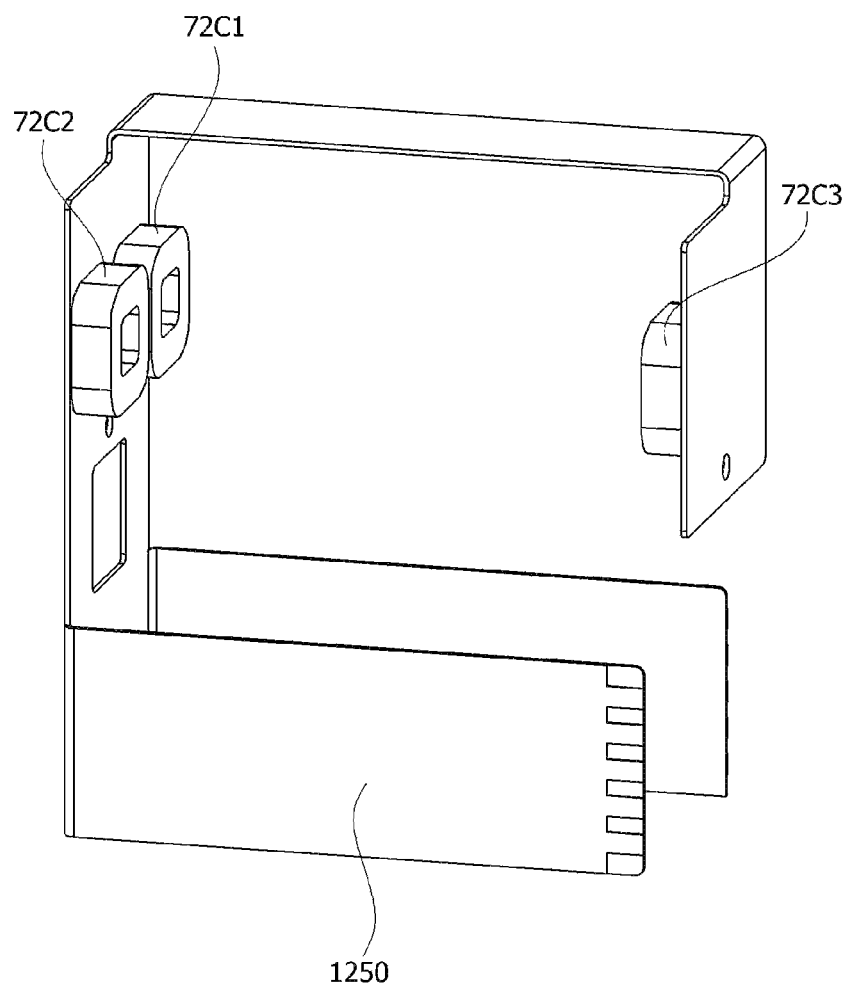

[FIG. 6B]
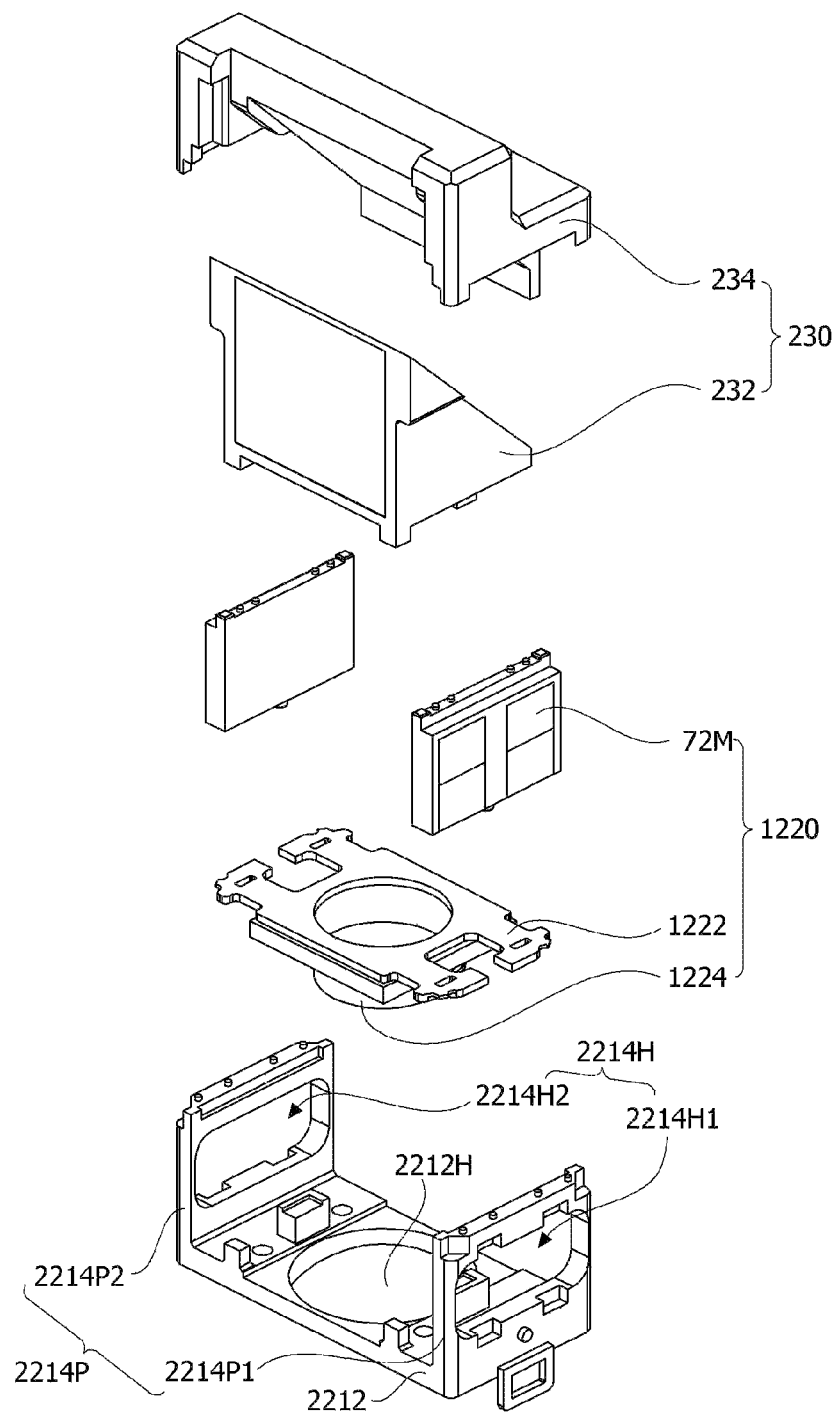

[FIG. 6C]
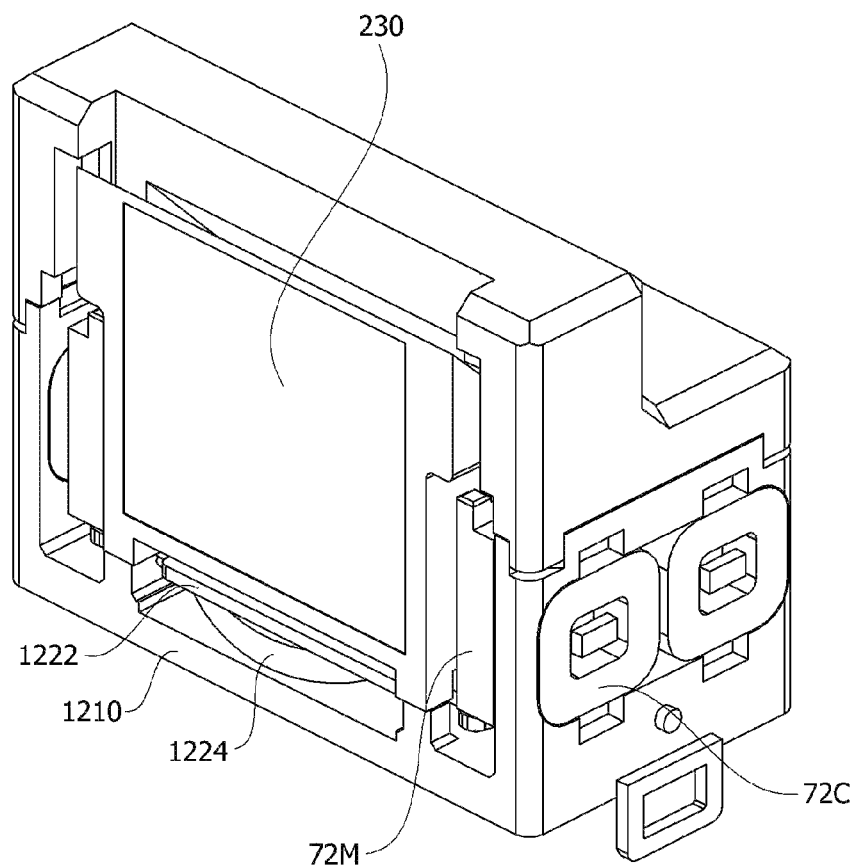
[FIG. 7]
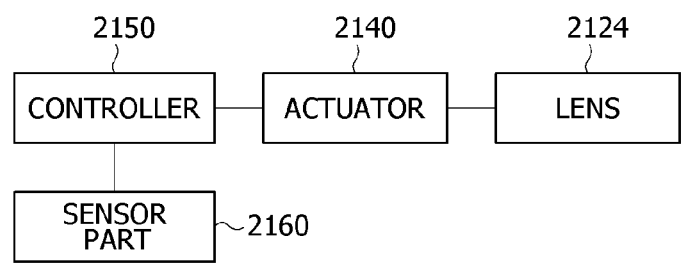

[FIG. 8]
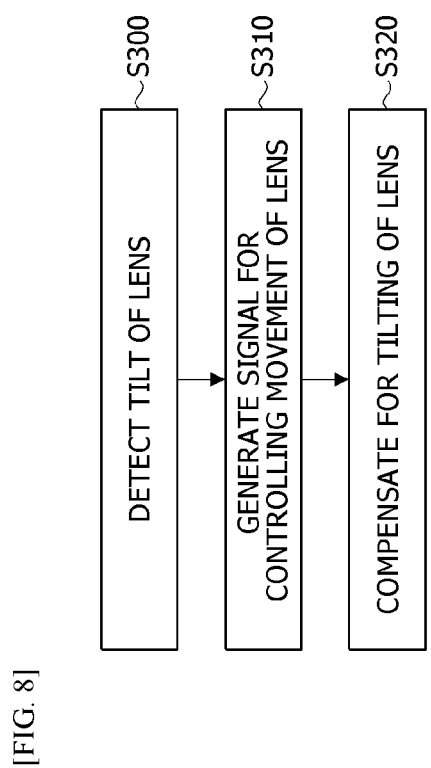

[FIG. 9]
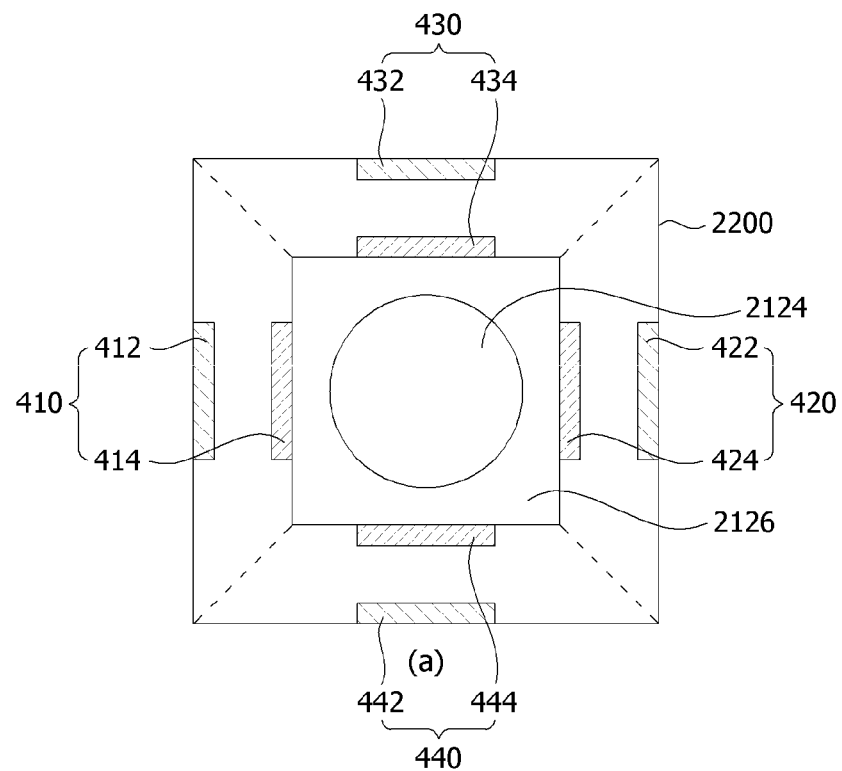
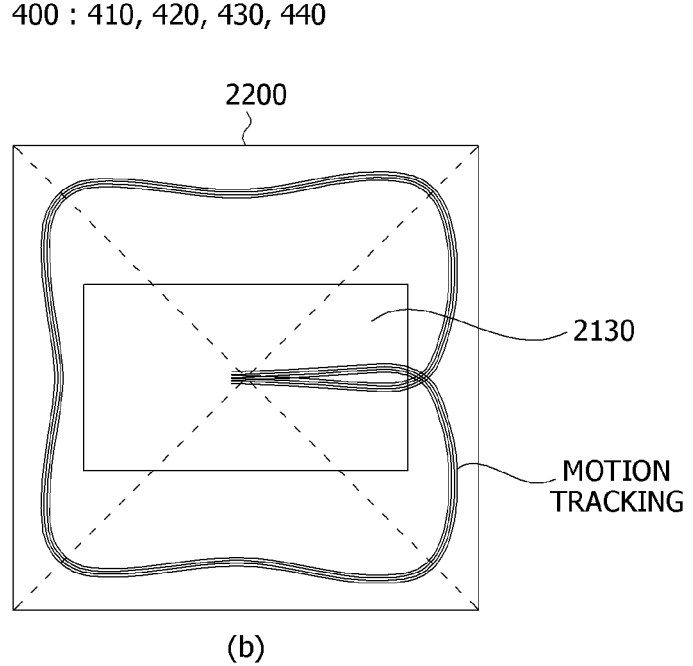

[FIG. 10]
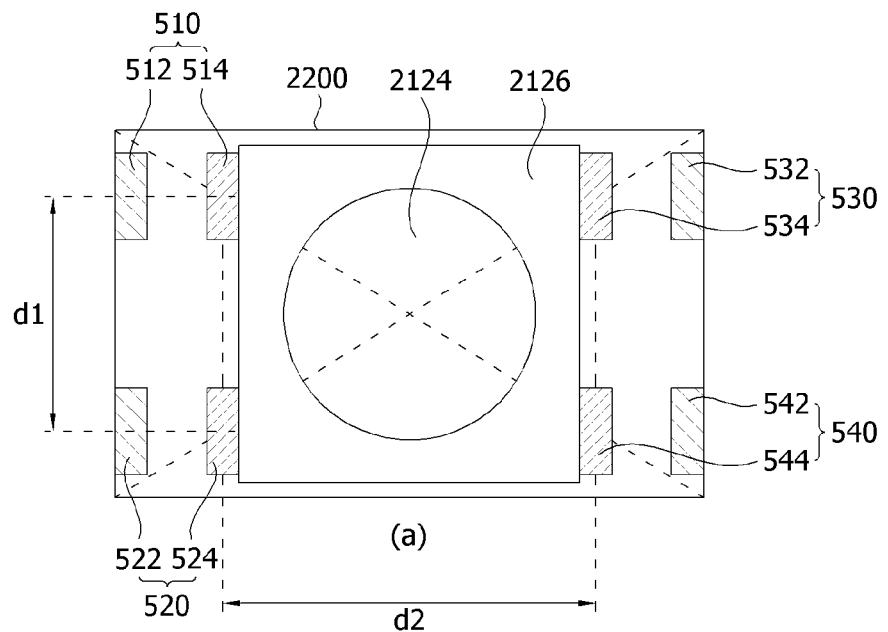
(a)
500 : 510, 520, 530, 540
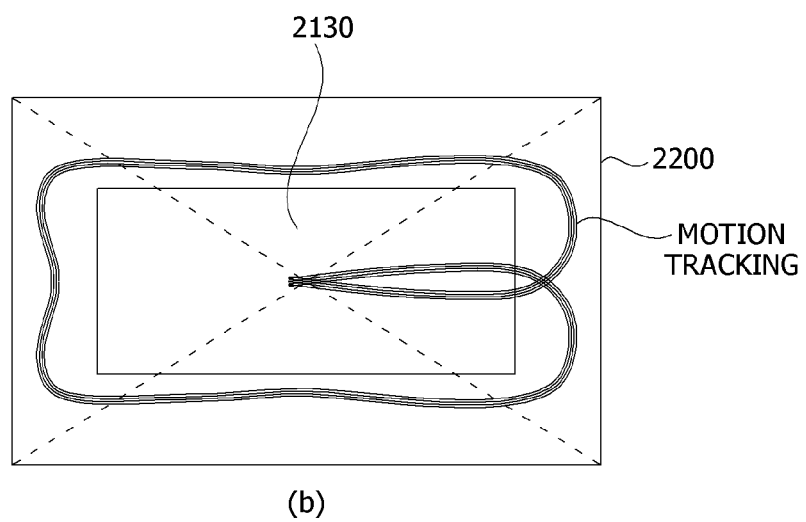
(b)

[FIG. 11]
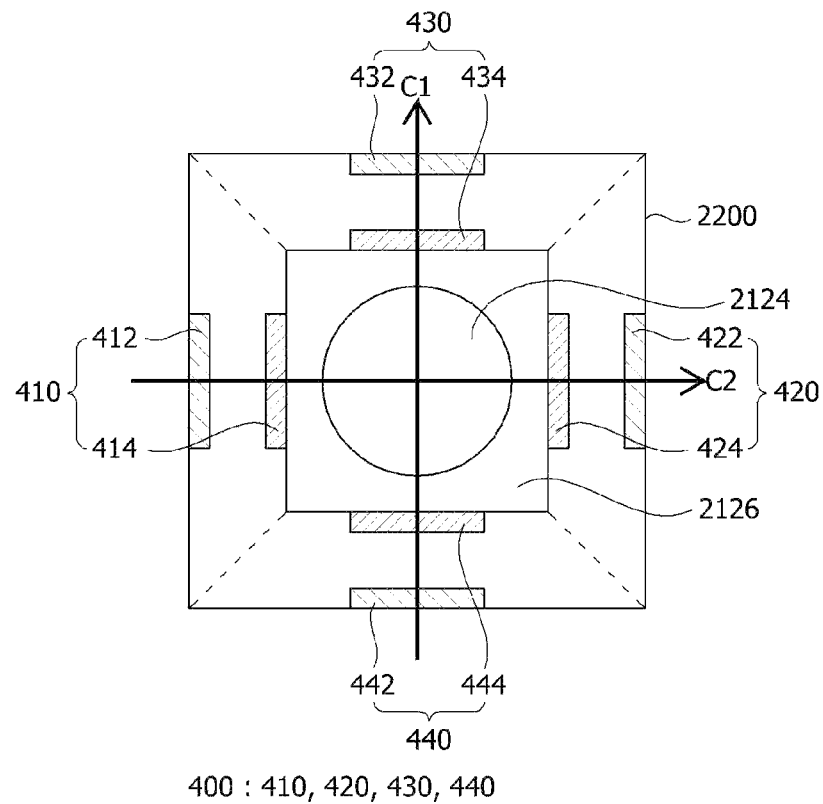
400 : 410, 420, 430, 440
[FIG. 12]
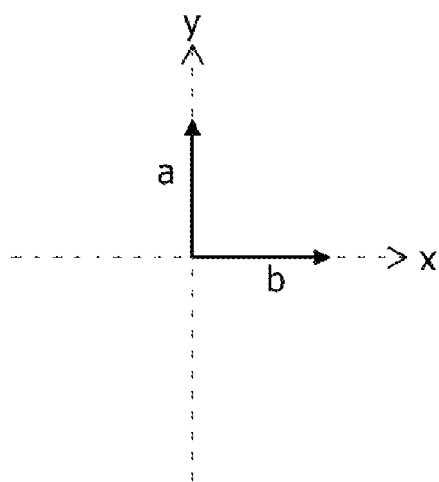

[FIG. 13]
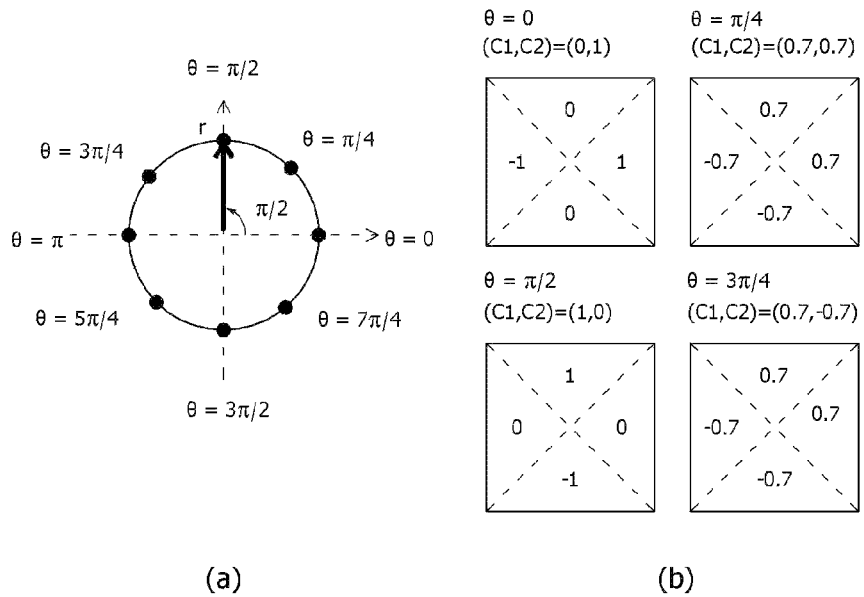
(a)　　　　　　　　　　　　(b)
[FIG. 14]
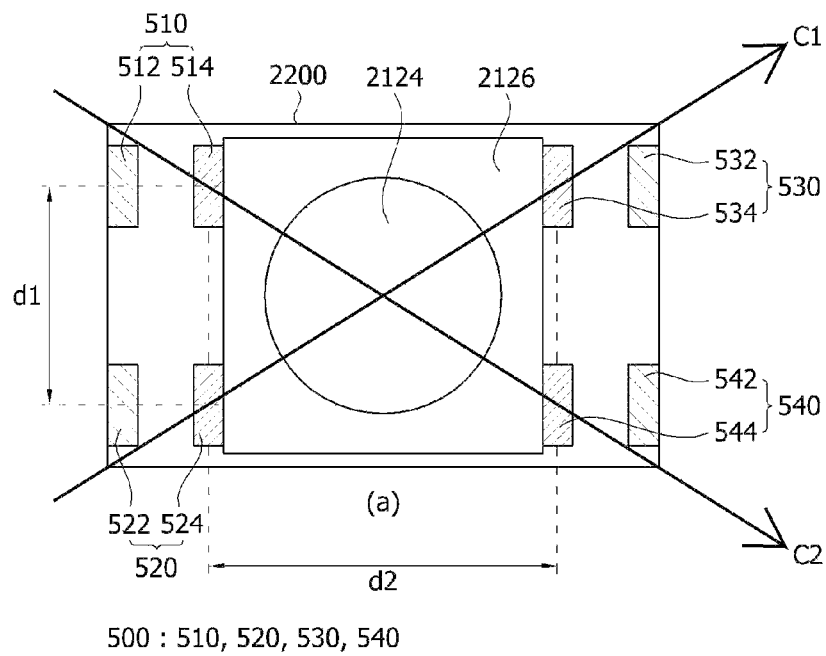
500 : 510, 520, 530, 540

[FIG. 15]
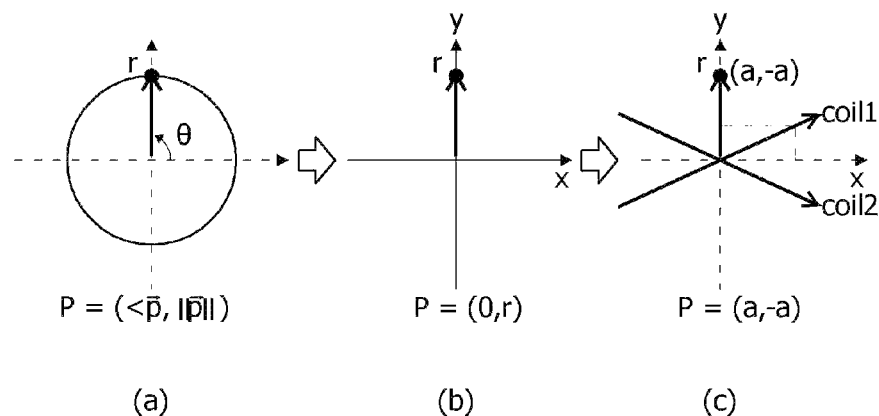
(a)　　　　　　　(b)　　　　　　　(c)
[FIG. 16]
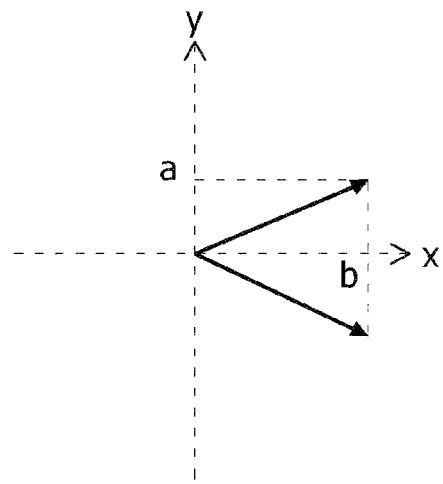

[FIG. 17]
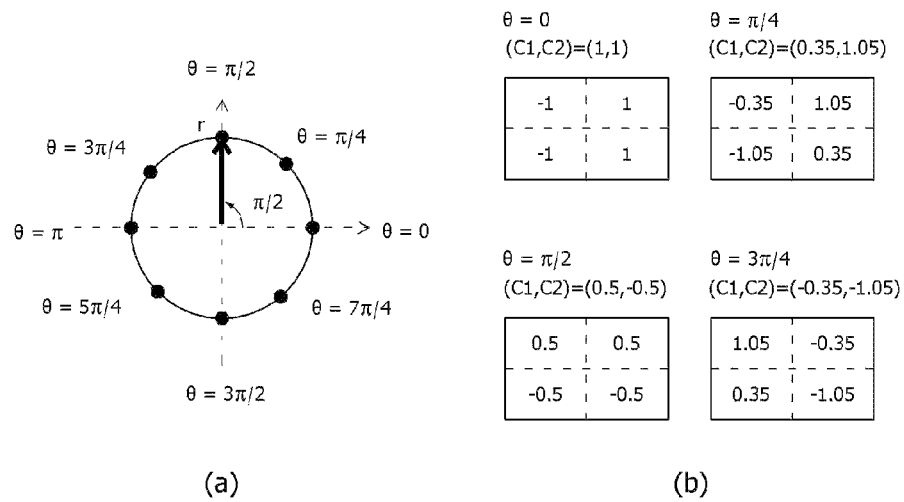
(a)  (b)
[FIG. 18]
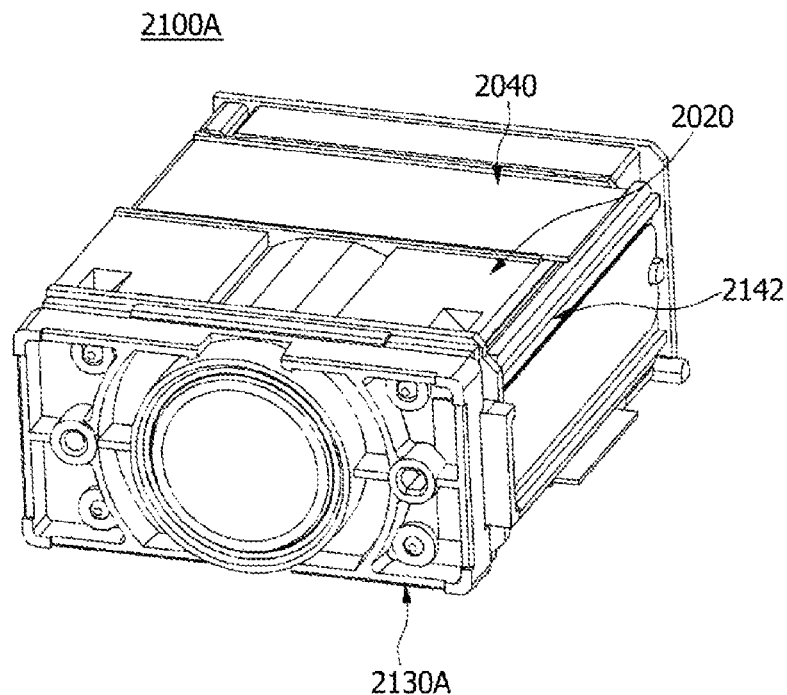

[FIG. 19]
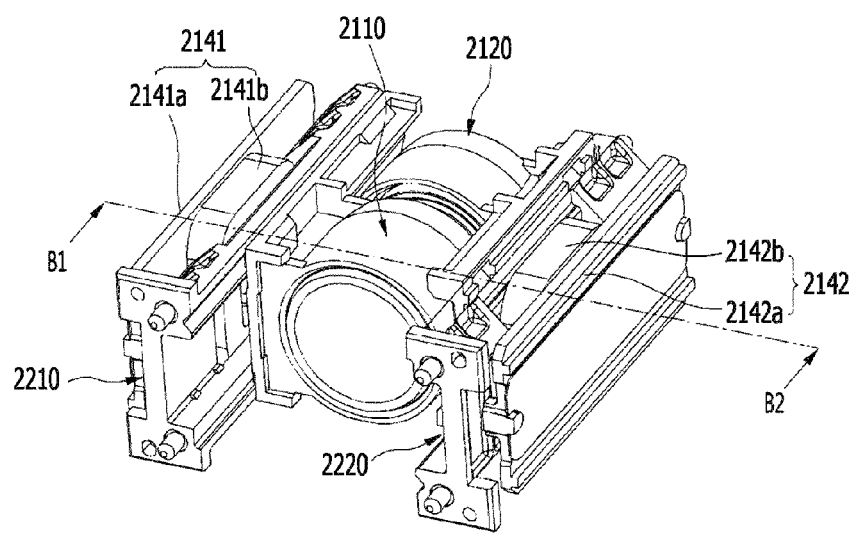
[FIG. 20]
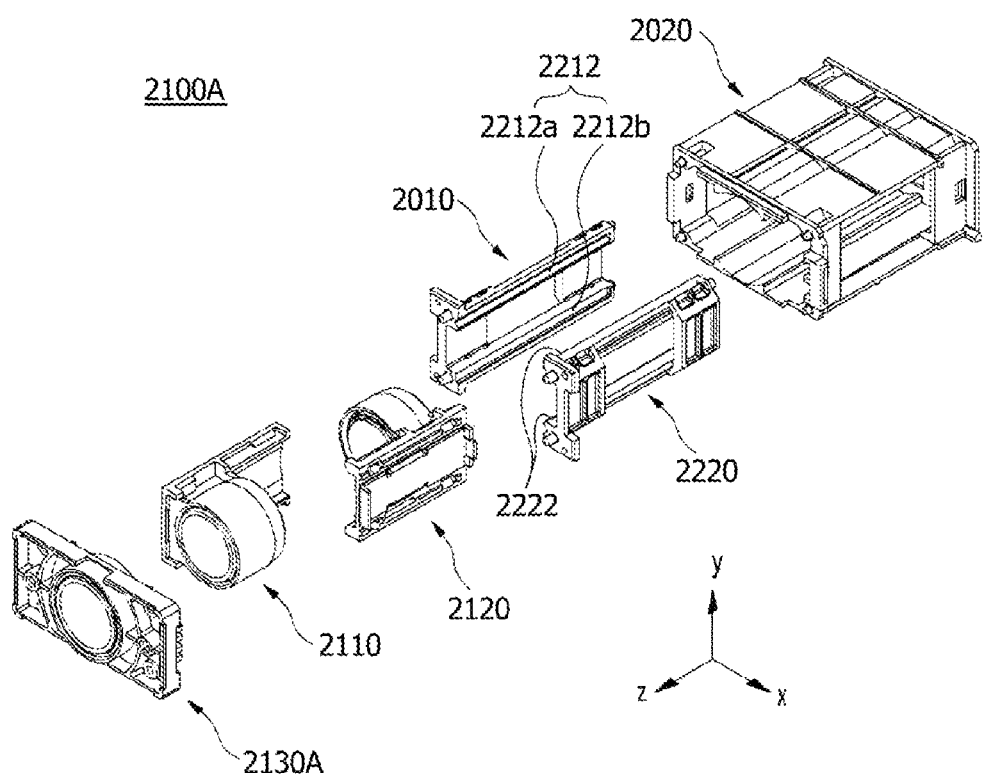

[FIG. 21a]
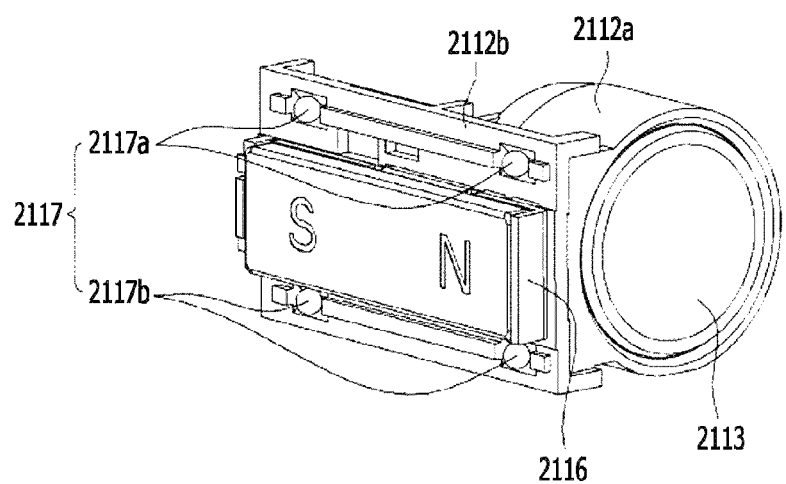
[FIG. 21b]
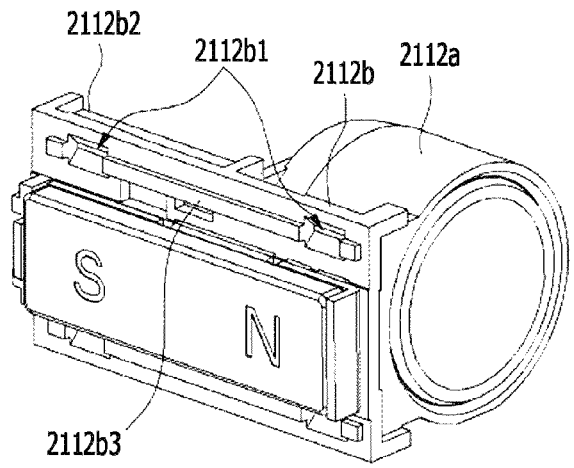

[FIG. 22]
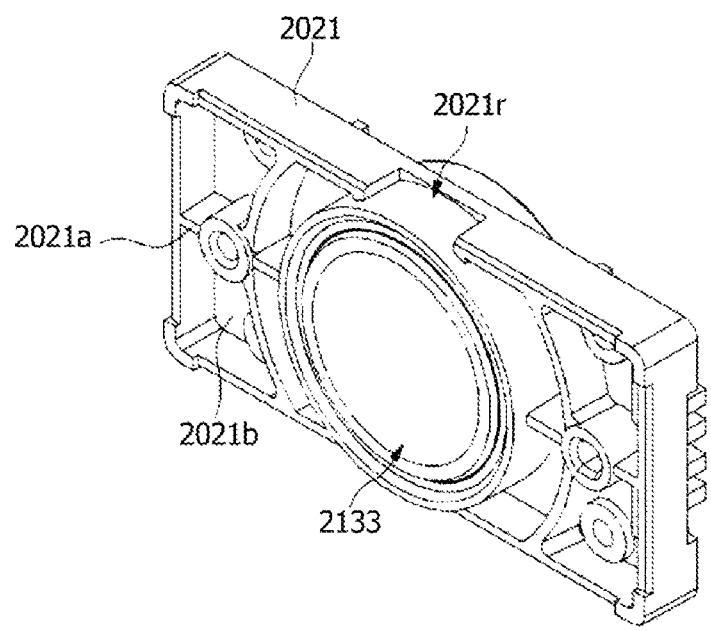

ACTUATOR CONTROL APPARATUS AND METHOD FOR CHANGING AN OPTICAL PATH OF A LENS

CROSS REFERENCE TO RELATED APPLICATIONS

This application is the National Phase of PCT/KR2020/000052 filed on Jan. 2, 2020, which claims priority under 35 U.S.C. § 119(a) to Patent Application Nos. 10-2019-0001218 and 10-2019-0052971 filed in the Republic of Korea on Jan. 4, 2019 and May 7, 2019, all of which are hereby expressly incorporated by reference into the present application.

TECHNICAL FIELD

The present invention relates to a camera, and more specifically, to an actuator control apparatus of a camera and a method of compensating for camera shake of the actuator control apparatus.

BACKGROUND ART

Cameras are apparatuses which take pictures or capture moving images of subjects and may have optical image stabilization (OIS) or auto focusing (AF) functions. The OIS function may be performed through a method of moving a lens in a direction perpendicular to an optical axis, and the AF function may be performed through a method of moving a lens in an optical axis direction.

To this end, the camera may include an actuator which moves the lens.

Generally, an actuator may be disposed on four surfaces or four corners of a camera, and an actuator outline may be formed in a square shape. However, since an image sensor embedded in the camera has an aspect ratio of 4:3 or 16:9, the actuator should be disposed in a square shape according to a length of a long axis of the image sensor. Therefore, there is a problem of increasing a size of the camera due to the actuator.

Technical Problem

The present invention is directed to providing an actuator control apparatus of a camera and a method of compensating for camera shake.

Technical Solution

One aspect of the present invention provides an actuator control apparatus including an actuator which changes an optical path of a lens, and a controller which controls the actuator, wherein the actuator includes a first driver and a second driver, which are disposed at a first side of a lens support member, and a third driver and a fourth driver which are disposed at a second side of the lens support member, a first distance between the first driver and the second driver is different from a second distance between the first driver and the third driver, the first driver and the fourth driver are positioned opposite to each other in a diagonal direction, the controller applies a first current to the second driver and the third driver, the controller applies a second current to the first driver and the fourth driver, and when the lens moves in the diagonal direction, an absolute value of the first current is different from an absolute value of the second current.

Another aspect of the present invention provides an actuator control apparatus including an actuator which changes an optical path of a lens, and a controller which controls the actuator, wherein the actuator includes a first driver and a second driver, which are disposed at a first side of a lens support member, and a third driver and a fourth driver which are disposed at a second side of the lens support member, a first distance between the first driver and the second driver is different from a second distance between the first driver and the third driver, the controller applies a first current to the second driver and the third driver, the controller applies a second current to the first driver and the fourth driver, and a current value of the first current and a current value of the second current are determined using at least one of the first distance, the second distance, and a tilting direction of the lens.

The first driver and the fourth driver may be positioned opposite to each other in a diagonal direction, and when the lens moves in the diagonal direction, an absolute value of the first current may be different from an absolute value of the second current.

When the lens moves in an up-down direction which is a direction of the first distance or in a left-right direction which is a direction of the second distance, the absolute value of the first current may be the same as the absolute value of the second current.

A current value of the first current and a current value of the second current may be changed according to a tilting direction of the lens.

A distance between the third driver and the fourth driver may be the first distance, and a distance between the second driver and the fourth driver may be the second distance.

The first distance may be shorter than the second distance.

The first driver and the fourth driver may move in different directions.

The absolute value of the first current when the lens is tilted in the left-right direction may be greater than the absolute value of the first current when the lens is tilted in the up-down direction.

The actuator may be an actuator for compensating for shake of the lens, and the controller may generate a signal for driving the actuator using a value detected by a gyro sensor.

The actuator may be an actuator for adjusting a focal length of the lens.

The lens support member may be a shaper member which presses the lens to reversibly change a shape of the lens.

The lens support member may be a lens barrel which accommodates the lens and moves with the lens.

Still another aspect of the present invention provides a method of compensating for camera shake, the method including detecting a tilting direction of a lens, generating a control signal for movement of the lens according to the tilting direction of the lens, and compensating for the tilting direction of the lens according to the control signal, wherein the compensating for of the tilting direction includes determining current values of currents applied to drivers on the basis of distances between the drivers which move the lens, positions of the drivers which move the lens, and the detected tilting direction of the lens, and the current values of the currents are changed according to the tilting direction of the lens to be compensated for.

In a case in which the tilting direction of the lens to be compensated for is an up-down direction or left-right direction, absolute values of the currents applied to the drivers are the same. The absolute values of the currents applied to the drivers, when the tilting direction of the lens to be compensated for is the up-down direction, are smaller than the absolute values of currents applied to the drivers when the tilting direction of the lens to be compensated for is the left-right direction. When the tilting direction of the lens is a diagonal direction, the absolute values of currents applied to some drivers among the drivers may be different from the absolute values of currents applied to the remaining drivers among the drivers.

The generating of the signal for controlling operation of the lens for compensating for shake of the lens includes generating a first control value to control the operation of the lens according to a degree at which an optical axis of the lens is misaligned and generating a second control value by correcting the first control value using distances and positions of the drivers which move the lens.

The drivers may include a first driver and a second driver, which are disposed at a first side of a lens support member, and a third driver and a fourth driver which are disposed at a second side of the lens support member, a first distance between the first driver and the second driver may be different from a second distance between the first driver and the third driver, the first driver and the fourth driver may be positioned opposite to each other in a diagonal direction, a first current may be applied to the second driver and the third driver, a second current may be applied to the first driver and the fourth driver, and when the lens moves in the diagonal direction, an absolute value of the first current may be different from an absolute value of the second current.

Advantageous Effects

According to embodiments of the present invention, a small camera having an optical image stabilization function and an auto focusing function can be provided. Particularly, according to the embodiments of the present invention, it is possible to precisely compensate for shake in various directions on a plane perpendicular to an optical axis.

DESCRIPTION OF DRAWINGS

FIG. 1 is a cross-sectional view illustrating a camera according to one embodiment of the present invention.

FIG. 2 is a perspective view illustrating a camera of another embodiment of the present invention.

FIG. 3A is a perspective view illustrating the camera illustrated in FIG. 2 from which a shield can is removed, and 3B is a plan view illustrating the camera illustrated in FIG. 3A.

FIG. 4A is a perspective view illustrating a first camera module illustrated in FIG. 3A, and FIG. 4B is a side cross-sectional view illustrating the first camera module illustrated in FIG. 4A.

FIG. 5A is a perspective view illustrating a second actuator of the camera of the embodiment illustrated in FIG. 2 when viewed in one direction, and FIG. 5B is a perspective view illustrating the second actuator of the camera of the embodiment illustrated in FIG. 2 when viewed in another direction.

FIG. 6A is a perspective view illustrating a second circuit board and a driver of the second actuator of FIG. 5A, FIG. 6B is a partially exploded perspective view illustrating the second actuator of the embodiment illustrated in FIG. 5B, and FIG. 6C is a perspective view illustrating the second actuator of the embodiment illustrated in FIG. 5B from which the second circuit board is removed.

FIG. 7 is a block diagram for compensating for camera shake according to one embodiment of the present invention.

FIG. 8 is a flowchart showing a method of compensating for camera shake according to one embodiment of the present invention.

FIG. 9A is a view illustrating an arrangement position of an actuator included in the camera according to one embodiment of the present invention, and FIG. 9B is a view showing motion tracking of a lens according to the arrangement position of FIG. 9A.

FIG. 10A is a view illustrating an arrangement position of an actuator included in a camera according to another embodiment of the present invention, and FIG. 10B is a view showing motion tracking of a lens according to the arrangement position of FIG. 10A.

FIG. 11 is a view illustrating a two-channel control structure of the actuator illustrated in FIG. 9.

FIG. 12 is a view showing a principle for calculating a control value of the actuator illustrated in FIG. 9.

FIG. 13 is a view showing a simulation result of the actuator illustrated in FIG. 9.

FIG. 14 is a view illustrating a two-channel control structure of the actuator illustrated in FIG. 10.

FIGS. 15 to 16 are views showing a principle for calculating a control value of the actuator illustrated in FIG. 10.

FIG. 17 is a view showing a simulation result of the actuator illustrated in FIG. 10.

FIG. 18 is a perspective view illustrating an actuator for auto focusing (AF) or zooming according to another embodiment of the present invention.

FIG. 19 is a perspective view illustrating the actuator, in which some components are omitted, according to the embodiment illustrated in FIG. 18.

FIG. 20 is an exploded perspective view illustrating the actuator, in which some components are omitted, according to the embodiment illustrated in FIG. 18.

FIG. 21A is a perspective view illustrating a first lens assembly (2110) in the actuator according to the embodiment illustrated in FIG. 20, and FIG. 21B is a perspective view illustrating the first lens assembly (2110), illustrated in FIG. 21A from which some components are removed.

FIG. 22 is a perspective view illustrating a third lens assembly (2130A) in the actuator according to the embodiment illustrated in FIG. 20.

[Modes of the Invention]

Hereinafter, exemplary embodiments of the present invention will be described in detail with reference to the accompanying drawings.

However, the technical spirit of the present invention is not limited to some embodiments which will be described and may be realized in a variety of different forms, and one or more components of the embodiments may be selectively combined, substituted, and used to realize the technical spirit within the range of the technical spirit.

In addition, unless clearly and specifically defined otherwise by the context, all terms (including technical and scientific terms) used herein can be interpreted as having meanings customary to those skilled in the art, and meanings of generally used terms, such as those defined in commonly used dictionaries, will be interpreted in consideration of contextual meanings of the related technology.

In addition, the terms used in the embodiments of the present invention are considered in a descriptive sense and not to limit the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In descriptions of components of the present invention, terms such as "first," "second," "A," "B," "(a)," and "(b)" can be used.

The terms are only to distinguish one element from another element, and the essence, order, and the like of the element are not limited by the terms.

It should be understood that, when an element is referred to as being "connected or coupled" to another element, such a description may include both a case in which the element is directly connected or coupled to another element, and a case in which the element is connected or coupled to another element with still another element disposed therebetween.

In a case in which any one element is described as being formed or disposed "on or under" another element, such a description includes both a case in which the two elements are formed or disposed to be in direct contact with each other and a case in which one or more other elements are interposed between the two elements. In addition, when one element is described as being formed "on or under" another element, such a description may include a case in which the one element is formed at an upper side or a lower side with respect to another element.

FIG. 1 is a cross-sectional view illustrating a camera according to one embodiment of the present invention.

Referring to FIG. 1, a camera 100 includes a housing 110, a lens part 120, an image sensor 130, an actuator 140, and a controller 150.

The housing 110 accommodates the lens part 120, the image sensor 130, the actuator 140, and the controller 150.

The lens part 120 includes an infrared (IR) filter 122, a plurality of lenses 124 disposed above the IR filter 122, and a lens barrel 126 coupled to the plurality of lenses 124. A space capable of accommodating at least parts of the IR filter 122 and the plurality of lenses 124 may be provided in the lens barrel 126. The lens barrel 126 may be rotation-coupled to one or more lenses, but this is illustrative, and the lens barrel 126 may be coupled thereto in one of various manners such as a manner using an adhesive (for example, an adhesive resin such as epoxy).

The housing 110 may be coupled to the lens barrel 126 to support the lens barrel 126. The controller 150 may be implemented using a printed circuit board (PCB) or drive integrated circuit (IC), and the image sensor 130 may be mounted on the PCB. The housing 110 and the lens barrel 126 may be attached by an adhesive, integrally manufactured, or coupled. Alternatively, a spring may also be disposed between the housing 110 and the lens barrel 126. However, in FIG. 1, a shape of the housing 110, a shape of the lens barrel 126, a coupling relationship between the housing 110 and the lens barrel 126, the number of the lenses 124, a position of the IR filter 122, and the like are exemplary and may be variously changed.

Meanwhile, the actuator 140 is disposed on the lens barrel 126 and moves the lenses 124. In this case, the actuator 140 may be an auto focusing actuator for moving the lenses 124 in an optical axis direction to adjust focal lengths of the lenses 124. Alternatively, the actuator 140 may be an optical image stabilization (OIS) actuator for compensating for shake of the lenses 124 by moving the lenses 124 in a direction perpendicular to an optical axis, that is a direction parallel to a plane on which the lens 124 is disposed.

FIG. 2 is a perspective view illustrating a camera of another embodiment of the present invention, FIG. 3A is a perspective view illustrating the camera illustrated in FIG. 2 from which a shield can is removed, and 3B is a plan view illustrating the camera illustrated in FIG. 3A.

Referring to FIG. 2, a camera 1000 may include one or more camera modules. For example, the embodiment may include a first camera module 1000A and a second camera module 1000B. The first camera module 1000A and the second camera module 1000B may be covered by a predetermined shield can 1510.

Referring to FIGS. 2, 3A, and 3B, in the embodiment, the first camera module 1000A may include one or more actuators. For example, the first camera module 1000A may include a first actuator 1100 and a second actuator 1200.

The first actuator 1100 may be electrically connected to a circuit board 1410 of a first group, the second actuator 1200 may be electrically connected to a circuit board 1420 of a second group, the circuit board 1420 of the second group may be electrically connected to the circuit board 1410 of the first group, and the second camera module 1000B may be electrically connected to a circuit board 1430 of a third group.

The first actuator 1100 may be a zoom actuator or auto focusing (AF) actuator. For example, the first actuator 1100 may support one or more lenses and perform an auto focusing function or zooming function by vertically moving the lens according to a predetermined control signal of a controller.

The second actuator 1200 may be an OIS actuator.

The second camera module 1000B may include a fixed focal length lens disposed in a predetermined tube (not shown). The fixed focal length lens may be referred to as a "single focal length lens" or "single lens."

The second camera module 1000B may be disposed in a predetermined housing (not shown) and include an actuator (not shown) capable of driving a lens part. The actuator may be a voice coil motor, a micro actuator, a silicone actuator, or the like, and any method such as an electrostatic method, a thermal method, a bimorph method, or an electrostatic force method can be applied to the actuator, but the present invention is not limited thereto. The second camera module 1000B may be the camera 100 according to the embodiment of FIG. 1.

Next FIG. 4A is a perspective view illustrating the first camera module illustrated in FIG. 3A, and FIG. 4B is a side cross-sectional view illustrating the first camera module illustrated in FIG. 4A.

Referring to FIG. 4A, the first camera module 1000A may include the first actuator 1100 which performs a zooming function or AF function and the second actuator 1200 which is disposed at one side of the first actuator 1100 and has an OIS function.

Referring to FIG. 4B, the first actuator 1100 may include an optical system disposed on a base 20 and a lens driver. For example, one or more among a first lens assembly 1110, a second lens assembly 1120, a third lens assembly 1130, and a guide pin 50 may be disposed on the base 20.

In addition, the first actuator 1100 may include a coil driver 1140 and a magnet driver 1160 to perform a high-magnification zooming function.

For example, the first lens assembly 1110 and the second lens assembly 1120 may be moving lenses which are moved by the coil driver 1140, the magnet driver 1160, and the guide pin 50, and the third lens assembly 1130 may be a fixed lens, but the present invention is not limited thereto.

For example, the first lens assembly 1110 and the second lens assembly 1120 may be driven by an electromagnetic force due to an interaction between the coil driver 1140 and the magnet driver 1160, through this, in the actuator and the camera module according to the embodiment, the problem of occurrence of decentering or tilting of the lens may be solved when zooming is performed, the plurality of lens groups may be accurately aligned to prevent a change in view angle or going out of focus, and thus image quality or resolution can be significantly improved.

In addition, the first actuator 1100 may include the circuit board of the first group disposed outside the base 20 and an element part 1150 including a gyro sensor.

In addition, a predetermined image sensor part 1190 may be disposed perpendicular to an optical axis direction of parallel light.

Next, the second actuator 1200 may include a housing 1210, a shake compensation unit 1220 disposed in the housing 1210, and a prism unit 1230 disposed on the shake compensation unit 1220. The shake compensation unit 1220 may include a shaper member 1222, a lens member 1224, a magnet driver 72M, and a coil driver 72C. In this case, the lens member 1224 may be used interchangeably with a liquid lens, a fluid lens, a variable prism, or the like a shape of the lens member 1224 may be reversibly changed by a pressure applied to a surface of the lens member 1224, and thus, an optical path passing through the lens member 1224 may be changed. For example, the lens member 1224 may include a fluid surrounded by an elastic membrane, the shaper member 1222 may be coupled, connected, or in direct contact with the lens member 1224, a pressure may be applied to the lens member 1224 due to movement of the shaper member 1222, and thus, the shape of the lens member 1224 may be reversibly changed and the optical path passing through the lens member 1224 may be changed. The movement of the shaper member 1222, which will be described below, may occur due to an interaction between the magnet driver 72M and the coil driver 72C.

To this end, the second actuator 1200 may be electrically connected to the circuit board of the second group.

As described above, the OIS may be implemented through control of the optical path passing through the lens member 1224, and accordingly, the occurrence of decentering or a tilt phenomenon can be minimized and best optical properties can be achieved.

Meanwhile, in a case in which the OIS actuator and the AF or zoom actuator are disposed according to the embodiment of the present invention, when the OIS is performed, magnetic field interference with a magnet for AF or zoom can be prevented. Since the magnet driver 72M of the second actuator 1200 is disposed to be separated from the first actuator 1100, magnetic field interference between the first actuator 1100 and the second actuator 1200 can be prevented.

Hereinafter, the detailed structure of the second actuator will be described in more detail.

FIG. 5A is a perspective view illustrating the second actuator of the camera of the embodiment illustrated in FIG. 2 when viewed in one direction, and FIG. 5B is a perspective view illustrating the second actuator of the camera of the embodiment illustrated in FIG. 2 when viewed in another direction. FIG. 6A is a perspective view illustrating a second circuit board and a driver of the second actuator of FIG. 5A, FIG. 6B is a partially exploded perspective view illustrating the second actuator of the embodiment illustrated in FIG. 5B, and FIG. 6C is a perspective view illustrating the second actuator of the embodiment illustrated in FIG. 5B from which the second circuit board is removed.

Referring to FIGS. 5A to 6C, since the shake compensation unit 1220 is disposed below the prism unit 1230, when the OIS is performed, a size limitation of a lens of a lens assembly of an optical system can be resolved so that a sufficient light amount can be secured.

A second circuit board 1250 may be connected to a predetermined power part (not shown) and may apply power to the coil driver 72C. The second circuit board 1250 may include a circuit board, such as a rigid PCB, a flexible PCB, and a rigid flexible PCB, having a wiring pattern for electrical connections.

The coil driver 72C may include one or more unit coil drivers and a plurality of coils. For example, the driver 72C may include a first unit coil driver 72C1, a second unit coil driver 72C2, a third unit coil driver 72C3, and a fourth unit coil driver (not shown).

In addition, the driver 72C may also further include a Hall sensor (not shown) to identify a position of the magnet driver 72M which will be described below. For example, the first unit coil driver 72C1 may include a first Hall sensor (not shown), and the third unit coil driver 72C3 may include a second Hall sensor (not shown).

Meanwhile, as described above, the shaper member 1222 may be disposed on the lens member 1224, and the shape of the lens member 1224 may be changed according to movement of the shaper member 1222. In this case, the magnet driver 72M is disposed on the shaper member 1222, and the coil driver 72C may be disposed in the housing 1210.

Referring to FIG. 6B, a predetermined opening 1212H through which light may pass is formed in a housing body 1212 of the housing 1210, and the housing 1210 may include a housing side portion 1214P which extends upward from the housing body 1212 and in which a hole 1214H is formed so that the coil driver 72C is disposed.

For example, the housing 1210 may include a first housing side portion 1214P1 which extends upward from the housing body 1212 and in which a hole 1214H1 is formed so that the coil driver 72C is disposed and a second housing side portion 1214P2 in which a hole 1214H2 is formed so that the driver 72C is disposed.

According to the embodiment, the coil driver 72C may be disposed in the housing side portion 1214P, the magnet driver 72M is disposed on the shaper member 1222, and the shaper member 1222 may be moved by an electromagnetic force between the coil driver 72C and the magnet driver 72M according to a voltage applied to the coil driver 72C. Accordingly, the shape of the lens member 1224 may be reversibly changed, the optical path passing through the lens member 1224 may be changed, and thus the OIS may be performed.

More specifically, the shaper member 1222 may include a shaper body in which a hole through which light may pass is formed and protrusions extending from the shaper body to side surfaces. The lens member 1224 may be disposed below the shaper body, and the magnet driver 72M may be disposed on the protrusion of the shaper member 1222. For example, a part of the magnet driver 72M may be disposed on the protrusion disposed on one side surface of the shaper member 1222, and the remaining part thereof may be disposed on the protrusion disposed on another side surface of the shaper member 1222. In this case, the magnet driver 72M may be disposed to be coupled to the shaper member 1222. For example, grooves are formed in the protrusions of the shaper member 1222, and the magnet driver 72M may be inserted into the grooves.

Meanwhile, a fixed type prism 1232 may be a rectangular prism and may be disposed inside the magnet driver 72M of the shake compensation unit 1220. In addition, a predetermined prism cover 1234 may be disposed above the fixed type prism 1232, and the fixed type prism 1232 may be tightly coupled to the housing 1210.

FIG. 7 is a block diagram for compensating for camera shake according to one embodiment of the present invention, and FIG. 8 is a flowchart showing a method of compensating for camera shake according to one embodiment of the present invention. In this case, a camera 2100 may be the camera 100 of FIG. 1 or the camera 1000 of FIGS. 2 to 6.

Referring to FIGS. 7 to 8, a sensor part 2160 embedded in the camera 2100 detects at least one of a tilting direction and a tilt degree of a lens 2124 (S300). In this case, the lens 2124 may be the lens 124 included in the camera 100 according to the embodiment of FIG. 1 or the lens included in the camera 1000 according to the embodiment of FIGS. 2 to 6. In this case, tilt of the lens 2124 may occur due to hand shake or external vibration and may be expressed as a misalignment amount of an optical axis. The tilting direction of the lens 2124 may be a direction parallel to a plane perpendicular to the optical axis, that is a plane on which the lens 2124 is disposed, the tilt degree of the lens 2124 may be expressed as at least one of a tilt magnitude and a tilt angle. In order to detect at least one of the tilting direction and the tilt degree of the lens 2124, the sensor part 2160 may include a gyro sensor but is not limited thereto and any sensor capable of detecting movement or shake of the camera 2100 can be used as the sensor part 2160.

Next, a controller 2150 generates a signal for controlling movement of the lens 2124 according to at least one of the tilting direction and the tilt degree of the lens 2124 detected by the sensor part 2160 (S310). In the present specification, movement, tilt, and motion of the lens 2124 may be movement of the lens 124 with a lens barrel 126 in the case of the camera 100 according to the embodiment FIG. 1 and may be those in which a shape of the lens member 1224 is reversibly changed in the case of the camera 1000 according to the embodiment of FIGS. 2 to 6. In this case, the signal for controlling movement of the lens 2124 may be generated on the basis of a movement direction, a movement angle, and a movement magnitude that the lens 2124 should move in order to compensate for tilt of the lens 2124. To this end, relationships between a tilting direction or tilt degree of the lens 2124 and a movement direction, a movement angle, and a movement magnitude by which the lens 2124 should move in order to compensate for tilt of the lens 2124 may match with each other and may be stored in the controller 2150 or a storage (not shown) connected to the controller 2150 in advance. The signal for controlling the movement of the lens 2124 may be expressed as, for example, a value of a current applied to an actuator 2140. In this case, the actuator 2140 may be the actuator 140 according to the embodiment of FIG. 1 or the second actuator 1200 according to the embodiment of FIGS. 2 to 6. In addition, the controller 2150 may generate a first control value for controlling movement of a lens according to a degree by which the optical axis of the lens 2124 is misaligned. In addition, the controller 2150 may generate a second control value corrected from the first control value using distances between drivers and positions of the drivers which move the lens 2124.

Next, the actuator 2140 compensates for the tilting direction of the lens 2124 according to the signal which is generated in the operation S310 to control the movement of the lens 2124 (S320). That is, the actuator 2140 moves the lens 2124 according to at least one among the movement direction, the movement angle, and the movement magnitude by which the lens 2124 should move in order to compensate for the tilt of the lens 2124. Accordingly, shake of the camera 2100 can be optically compensated for.

FIG. 9A is a view illustrating an arrangement position of an actuator included in a camera according to one embodiment of the present invention, and FIG. 9B is a view showing motion tracking of a lens according to the arrangement position of FIG. 9A. FIG. 10A is a view illustrating an arrangement position of an actuator included in a camera according to another embodiment of the present invention, and FIG. 10B is a view showing motion tracking of a lens according to the arrangement position of FIG. 10A.

Referring to FIGS. 9A, 9B, 10A, and 10B, a lens 2124 may be coupled to a lens support member 2126, and an actuator may be disposed between the lens support member 2126 and an actuator outline 2200. In this case, the lens support member 2126 may be the lens barrel 126 of the camera 100 according to the embodiment of FIG. 1 or the shaper member 1222 of the camera 1000 according to the embodiment of FIGS. 2 to 6. In this case, the actuator outline 2200 may be an inner surface of the housing 110 of the camera according to the embodiment of FIG. 1 or an inner surface of the housing 1210 of the second actuator 1200 according to the embodiment of FIGS. 2 to 6.

Referring to FIG. 9A, an actuator 400 may include a first driver 410, a second driver 420, a third driver 430, and a fourth driver 440. The first driver 410 may be disposed at a first side of the lens support member 2126, the second driver 420 may be disposed at a second side opposite to the first side of the lens support member 2126, the third driver 430 may be disposed at a third side between the first side and the second side of the lens support member 2126, and the fourth driver 440 may be disposed at a fourth side opposite to the third side of the lens support member 2126. Accordingly, the first driver 410, the second driver 420, the third driver 430, and the fourth driver 440 of the actuator 400 may be disposed in a square shape.

In this case, the first driver 410, the second driver 420, the third driver 430, and the fourth driver 440 may include coils 412, 422, 432, and 442 and magnets 414, 424, 434, and 444, respectively. In this case, the coils 412, 422, 432, and 442 of the drivers may be disposed on the actuator outline 2200, and the magnets 414, 424, 434, and 444 of the drivers may be disposed on sidewalls of the lens support member 2126 to be spaced apart from and paired with the coils 412, 422, 432, and 442 of the drivers, respectively.

Referring to FIG. 10A, an actuator 500 may include a first driver 510, a second driver 520, a third driver 530, and a fourth driver 540. The first driver 510 and the second driver 520 may be disposed at a first side of a lens support member 2126, and the third driver 530 and the fourth driver 540 may be disposed at a second side opposite to the first side of the lens support member 2126. In this case, the first side and the second side of the lens support member 2126 may be surfaces disposed in a direction of a short side of a rectangular shaped image sensor 2130.

The first driver 510 and the fourth driver 540 may be disposed in a diagonal direction, and the second driver 520 and the third driver 530 may be disposed in a diagonal direction.

Accordingly, a first distance d1 between the first driver 510 and the second driver 520 may be different from a second distance d2 between the first driver 510 and the third driver 530, the first distance d1 between the first driver 510 and the second driver 520 may be the same as a first distance d1 between the third driver 530 and the fourth driver 540, and the second distance d2 between the first driver 510 and the third driver 530 may be the same as a second distance d2 between the second driver 520 and the fourth driver 540. In addition, the first distance d1 which is a distance between the first driver 510 and the second driver 520 and a distance between the third driver 530 and the fourth driver 540 may be shorter than the second distance d2 which is a distance between the first driver 510 and the third driver 530 and a distance between the second driver 520 and the fourth driver 540.

For the sake of convenience of description, in the present specification, a direction from the first driver 510 to the second driver 520 and from the third driver 530 to the fourth driver 540 are referred to as an up-down direction, a direction from the first driver 510 to the third driver 530 and a direction from the second driver 520 to the fourth driver 540 are referred to as a left-right direction, and a direction from the first driver 510 to the fourth driver 540 and a direction from the second driver 520 to the third driver 530 are referred to as diagonal directions.

In this case, the first driver 510, the second driver 520, the third driver 530, and the fourth driver 540 may include coils 512, 522, 532, and 542 and magnets 514, 524, 534, and 544, respectively. In this case, the coils 512, 522, 532, and 542 may be the coil driver 72C in the camera according to the embodiment of FIGS. 2 to 6, and the magnets 514, 524, 534, 544 may be the magnet driver 72M in the camera according to the embodiment of FIGS. 2 to 6. In this case, the magnet 514 of the first driver 510 and the magnet 524 of the second driver 520 may be disposed on the first side of the lens support member 2126 to be spaced apart from each other, and the coil 512 of the first driver 510 and the coil 522 of the second driver 520 may be disposed on one surface of an actuator outline 2200 facing the first side of the lens support member 2126 to be spaced apart from and paired with the magnet 514 of the first driver 510 and the magnet 524 of the second driver 520, respectively. In the same way, the magnet 534 of the third driver 530 and the magnet 544 of the fourth driver 540 may be disposed at the second side of the lens support member 2126, and the coil 532 of the third driver 530 and the coil 542 of the fourth driver 540 may be disposed on one surface of the actuator outline 2200 facing the second side of the lens support member 2126 to be spaced apart from and paired with the magnet 534 of the third driver 530 and the magnet 544 of the fourth driver 540, respectively. Accordingly, the first driver 510, the second driver 520, the third driver 530, and the fourth driver 540 of the actuator 500 may be disposed in a rectangular shape.

Referring to FIGS. 10A and 10B, in a case in which the image sensor 2130 has the rectangular shape in an aspect ratio of 4:3 or 16:9, since a driver is not disposed at a long side of the image sensor 2130, an additional space may not need to be secured between the lens support member 2126 and the actuator outline 2200, and accordingly, the camera can be formed to have a small size. In addition, as illustrated in FIG. 10B, since movement of the lens is restricted in around the image sensor 2130, preciseness of compensation can be improved, and power consumption of the actuator can also be reduced.

For the sake of convenience, the actuator disposed as illustrated in FIG. 9A may be referred to as a symmetrical actuator, and the actuator disposed as illustrated in FIG. 10A may be referred to as an asymmetrical actuator.

Hereinafter, a method of controlling an actuator according to an embodiment of the present invention will be described. Hereinafter, an example of a method of compensating for shake will be described but will not be limited thereto, and a method of controlling the actuator described in the specification may be applied to a method of controlling auto focusing through the same or a similar manner.

FIG. 11 is a view illustrating a two-channel control structure of the actuator illustrated in FIG. 9, FIG. 12 is a view showing a principle for calculating a control value of the actuator illustrated in FIG. 9, and FIG. 13 is a view showing a simulation result of the actuator illustrated in FIG. 9.

Referring to FIG. 11, it is assumed that the actuator 400 includes the first driver 410, the second driver 420, the third driver 430, and the fourth driver 440 as described above. The third driver 430 and the fourth driver 440, which are disposed in an up-down direction to face each other, form a first channel C1, and the first driver 410 and the second driver 420, which are disposed in a left-right direction to face each other, form a second channel C2. A first current is applied to the coils 432 and 442 of the first channel C1, and since the coils 432 and 442 of the first channel C1 are wound in opposite directions, the magnets 434 and 444 of the first channel C1 have opposite polarities. A second current is applied to the coils 412 and 422 of the second channel C2, and since the coils 412 and 422 of the second channel C2 are wound in opposite directions, the magnets 414 and 424 of the second channel C2 have opposite polarities.

Referring to FIG. 12, the first driver 410, the second driver 420, the third driver 430, and the fourth driver 440 are disposed on an x-axis and a y-axis of the actuator, and the first channel C1 between the third driver 430 and the fourth driver 440 is perpendicular to the second channel C2 between the first driver 410 and the second driver 420.

In this case, an angle and a magnitude of an output vector $\vec{vo}$ may be obtained using a 2×1 input vector $\vec{vI}$ and a 2×2 feature vector $\vec{H}$, and the feature vector $\vec{H}$ may be expressed as in the following Equation 1.

$$\vec{H} = \begin{bmatrix} b & 0 \\ 0 & a \end{bmatrix} \qquad \text{[Equation 1]}$$

In this case, a denotes a value of a distance between the drivers disposed in the first channel C1, and b denotes a value of a distance between the drivers disposed in the second channel C2. In a case in which the actuator 400 is disposed in the square shape as illustrated in FIG. 9, a and b may be the same.

When described with reference to an example of $\vec{vI}=[1\ 1]$, an angle and a magnitude of the output vector $\vec{vo}$ may be expressed as in the following Equations 2 to 3.

$$\vec{vO} = \begin{bmatrix} 1 & 1 \end{bmatrix} \begin{bmatrix} b & 0 \\ 0 & a \end{bmatrix} = \begin{bmatrix} b & a \end{bmatrix} \qquad \text{[Equation 2]}$$

$$<\vec{vO} = \tan^{-1}\frac{a}{b}, \text{ if } a=b, <\vec{vO} = 45° \qquad \text{[Equation 3]}$$
$$\|\vec{vO}\| = \sqrt{a^2 + b^2}$$

As a more specific embodiment, referring to Table 1 and FIG. 13, in a case in which an angle θ of the output vector is zero and r which is a magnitude of the output vector is one, the first current applied to the first channel C1 is zero, the second current applied to the second channel C2 is one, and the first driver 410 and the second driver 420 of the second channel C2 may have opposite polarities. In a case in which the angle θ of the output vector is π/4 and r which is the magnitude of the output vector is one, the first current of the first channel C1 is 0.7, the second current of the second channel C2 is 0.7 that is the same as the first current, the third driver 430 and the fourth driver 440 of the first channel C1 may have opposite polarities, and the first driver 410 and the second driver 420 of the second channel C2 may have opposite polarities. In a case in which the angle θ of the output vector is π/2 and r which is the magnitude of the output vector is one, the first current applied to the first channel C1 is one, the second current applied to the second channel C2 is zero, and the third driver 430 and the fourth driver 440 of the first channel C1 may have opposite polarities. In a case in which the angle θ of the output vector is 3π/4 and r which is the magnitude of the output vector is one, the first current applied to the first channel C1 is 0.7, and the second current applied to the second channel C2 is −0.7, the third driver 430 and the fourth driver 440 of the first channel C1 may have opposite polarities, and the first driver 410 and the second driver 420 of the second channel C2 may have opposite polarities.

TABLE 1

| No. | angle (θ) | R | | r/2 | |
|---|---|---|---|---|---|
| | | C1(*r) | C2(*r) | C1(*r) | C2(*r) |
| 1 | 0 | 1 | 0 | 0.5 | 0 |
| 2 | π/4 | 0.7 | 0.7 | 0.35 | 0.35 |
| 3 | π/2 | 0 | 1 | 0 | 0.5 |
| 4 | 3π/4 | −0.7 | 0.7 | −0.35 | 0.35 |
| 5 | π | −1 | 0 | −0.5 | 0 |
| 6 | 5π/4 | −0.7 | −0.7 | −0.35 | −0.35 |
| 7 | 3π/2 | 0 | −1 | 0 | −0.5 |
| 8 | 7π/4 | 0.7 | −0.7 | 0.35 | −0.35 |

FIG. 14 is a view illustrating a two-channel control structure of the actuator illustrated in FIG. 10, FIGS. 15 to 16 are views showing a principle for calculating a control value of the actuator illustrated in FIG. 10, and FIG. 17 is a view showing a simulation result of the actuator illustrated in FIG. 10.

Referring to FIG. 14, as described above, the actuator 500 includes the first driver 510, the second driver 520, the third driver 530, and the fourth driver 540, a direction of the first distance which is the distance between the first driver 510 and the second driver 520 and the distance between the third driver 530 and the fourth driver 540 is referred to as the up-down direction, and a direction of the second distance which is the distance between the first driver 510 and the third driver 530 and the distance between the second driver 520 and the fourth driver 540 is referred to as the left-right direction, a direction from the first driver 510 to the fourth driver 540 and a direction from the second driver 520 to the third driver 530 are referred to as the diagonal directions.

The second driver 520 and the third driver 530 disposed in the diagonal direction to face each other form a first channel C1, the first driver 510 and the fourth driver 540 disposed in the other diagonal direction to face each form a second channel C2, a first current applied to the first channel C1 controls the second driver 520 and the third driver 530, and a second current applied to the second channel C2 controls the first driver 510 and the fourth driver 540.

When the first current is applied to the coils 522 and 532 of the first channel C1, polarities of the magnets 524 and 534 of the first channel C1 are opposite to each other. When the second current is applied to the coils 512 and 542 of the second channel C2, polarities of the magnets 514 and 544 of the second channel C2 are opposite to each other. Accordingly, the first driver 510 and the fourth driver 540 may move in different directions, and the second driver 520 and the third driver 530 may move in different directions.

According to the embodiment of the present invention, in a case in which the first distance d1 between the first driver 510 and the second driver 520 is different from the second distance d2 between the first driver 510 and the third driver 530, that is, in a case in which the actuator 500 is asymmetrically disposed such that the first channel C1 is not perpendicular to the second channel C2, a current value of the first current applied to the first channel C1 disposed in the diagonal direction and a current value of the second current applied to the second channel C2 disposed in the other diagonal direction are determined using the first distance d1, the second distance d2, and a tilting direction of the lens 2124.

When the lens 2124 moves in the up-down direction which is the direction of the first distance d1 or in the left-right direction which is the direction of the second distance d2, an absolute value of the first current and an absolute value of the second current are the same, but in a case in which the lens 2124 moves in the diagonal direction, an absolute value of the first current is different from an absolute value of the second current.

In addition, in a case in which the first distance d1 in the up-down direction is shorter than the second distance d2 in the left-right direction, an absolute value of the first current when the lens 2124 is tilted by a predetermined value in the left-right direction is greater than an absolute value of the first current when the lens 2124 is tilted by the predetermined same value in the up-down direction, and an absolute value of the second current when the lens 2124 is tilted by a predetermined value in the left-right direction is greater than an absolute value of the second current when the lens 2124 is tilted by the same predetermined value in the up-down direction.

Meanwhile, as described above, shake compensation may be performed through a method of compensating for an amount of distortion of the optical axis of the lens 2124, and to this end, optical image stabilization or electrical image stabilization may be performed. As illustrated in FIG. 14, in the case of the asymmetric actuator, that is, when the relationship between the first channel C1 and the second channel C2 do not have a orthogonal relationship, an additional vector conversion is needed.

Referring to FIG. 15A, a degree at which the optical axis is misaligned may be expressed as a magnitude of an angle in the form of spherical coordinates, and the magnitude may be converted into values of rectangular coordinates as described in FIG. 15B. Finally, as illustrated in FIG. 15C, the magnitude may be converted into the form in which the first channel C1 and the second channel C2 are disposed, and the form may be controlled through a current amount multiplied by a proportionality constant.

More specifically, referring to FIG. 16, the first driver 510 and the fourth driver 540 are disposed in the diagonal direction, the second driver 520 and the third driver 530 are disposed in the other diagonal direction, and the first channel C1 between the second driver 520 and the third driver 530 is not perpendicular to the second channel C2 between the first driver 510 and the fourth driver 540.

In this case, an angle and a magnitude of an output vector $\overline{vo}$ may be obtained using a 2×1 input vector $\overline{vI}$ and 2×2 feature vector $\overline{H}$, and the feature vector $\overline{H}$ may be expressed as in the following Equation 4.

$$\vec{H} = \begin{bmatrix} b & -a \\ b & a \end{bmatrix} \quad \text{[Equation 4]}$$

In this case, a denotes a value of the distance between the first driver 510 and the second driver 520, and b denotes a value of the distance between the first driver 510 and the third driver 530. In this case, an example in which a is less than b will be described.

When described with reference to an example of $\vec{vI}$=[1 1], an angle and a magnitude of the output vector $\vec{vo}$ may be expressed as in the following Equations 5 to 6.

$$\vec{y} = [1 \ 1] \begin{bmatrix} b & -a \\ b & a \end{bmatrix} = [2b \ 0] \quad \text{[Equation 5]}$$

$$<\vec{y} = \tan^{-1} \frac{0}{2b} = 0°$$
$$\|\vec{y}\| = \sqrt{2b^2} = \sqrt{2} \, b \quad \text{[Equation 6]}$$

As a more specific embodiment, referring to Table 2 and FIG. 17, in a case in which it is assumed that a=0.5, b=1, and r which is a magnitude of the output vector is one, when an angle θ of the output vector is zero, an absolute value of the first current applied to the first channel C1 is one, an absolute value of the second current applied to the second channel C2 is one, the second driver 520 and the third driver 530 of the first channel C1 may have opposite polarities, and the first driver 510 and the fourth driver 540 of the second channel C2 may have opposite polarities. That is, it may be seen that from above, in a case in which the lens 2124 moves in the left-right direction, the absolute value of the first current applied to the first channel and the absolute value of the second current applied to the second channel are the same.

Next, in a case in which the angle θ of the output vector is π/4, an absolute value of the first current applied to the first channel C1 is 1.05, an absolute value of the second current applied to the second channel C2 is 0.35, which is different from the absolute value of the first current, the second driver 520 and the third driver 530 of the first channel C1 may have opposite polarities, and the first driver 510 and the fourth driver 540 of the second channel C2 may have opposite polarities. In addition, in a case in which the angle θ of the output vector is 3π/4, an absolute value of the first current applied to the first channel C1 is 0.35, an absolute value of the second current applied to the second channel C2 is 1.05, which is different from the absolute value of the first current, the second driver 520 and the third driver 530 of the first channel C1 may have opposite polarities, and the first driver 510 and the fourth driver 540 of the second channel C2 may have opposite polarities. Accordingly, it may be seen that, in a case in which the lens 2124 moves in the diagonal direction, the absolute value of the first current applied to the first channel is different from the absolute value of the second current applied to the second channel.

Next, when the angle θ of the output vector is π/2, an absolute value of the first current applied to the first channel C1 is 0.5, an absolute value of the second current applied to the second channel C2 is 0.5, the second driver 520 and the third driver 530 of the first channel C1 may have opposite polarities, and the first driver 510 and the fourth driver 540 of the second channel C2 may have opposite polarities. That is, it may be seen that from above, in a case in which the lens 2124 moves in the up-down direction, the absolute value of the first current applied to the first channel is the same as the absolute value of the second current applied to the second channel.

In addition, when the case in which the angle θ of the output vector is zero and the case in which the angle θ of the output vector is π/2 are compared, the absolute value of the first current and the absolute value of the second current when the lens 2124 moves in the left-right direction are respectively greater than the absolute value of the first current and the absolute value of the second current when the lens 2124 moves in the up-down direction.

TABLE 2

| No. | angle (θ) | r | | r/2 | |
|---|---|---|---|---|---|
| | | C1(*r) | C2(*r) | C1(*r) | C2(*r) |
| 1 | 0 | 1 | 1 | 0.5 | 0.5 |
| 2 | π/4 | 1.05 | 0.35 | 0.525 | 0.175 |
| 3 | π/2 | 0.5 | −0.5 | 0.25 | −0.25 |
| 4 | 3π/4 | −0.35 | −1.05 | −0.175 | −0.525 |
| 5 | π | −1 | −1 | −0.5 | −0.5 |
| 6 | 5π/4 | −1.05 | −0.35 | −0.525 | −0.175 |
| 7 | 3π/2 | −0.5 | 0.5 | −0.25 | 0.25 |
| 8 | 7π/4 | 0.35 | 1.05 | 0.175 | 0.525 |

Accordingly, the actuator control apparatus according to the embodiment of the present invention may allow miniaturizing a camera and moving the lens in any direction on the plane perpendicular to the optical axis.

In the present specification, the embodiment in which the actuator changes the optical path of the lens has been mainly described, but the present invention is not limited thereto, and the actuator according to the embodiment of the present invention may also be disposed to move an image sensor and may move the image sensor to perform an auto focusing function or shake compensation function.

The actuator control apparatus and the method according to the embodiment of the present invention may be applied to not only a red-green-blue (RGB) camera but also an infrared (IR) camera or time-of-flight (TOF) camera which extract depth information.

Meanwhile, the camera module including the OIS actuator and the AF or zoom actuator has been mainly described above, and particularly in FIGS. 4A and 4B, an example of the pin type camera module in which the lens assembly of the first actuator 1100 having the zooming function or AF function is guided by the guide pin has been described, but the camera module is not limited thereto. The actuator having the zooming function or AF function may be a ball type actuator guided by a ball.

FIG. 18 is a perspective view illustrating an actuator for AF or zooming according to another embodiment of the present invention, FIG. 19 is a perspective view illustrating the actuator, in which some components are omitted, according to the embodiment illustrated in FIG. 18, and FIG. 20 is an exploded perspective view illustrating the actuator, in which some components are omitted, according to the embodiment illustrated in FIG. 18.

Referring to FIG. 18, an actuator 2100A according to the embodiment may include a base 2020, a circuit board 2040 disposed outside the base 2020, a driver 2142, and a third lens assembly 2130A.

FIG. 19 is the perspective view in which the base 2020 and the circuit board 2040 are omitted from FIG. 18, and referring to FIG. 19, the actuator 2100A according to the embodiment may include a first guide 2210, a second guide 2220, a first lens assembly 2110, a second lens assembly 2120, a driver 2141, and a driver 2142.

Each of the driver 2141 and the driver 2142 may include a coil or magnet.

For example, in a case in which each of the driver 2141 and the driver 2142 includes the coil, the driver 2141 may include a first coil 2141*b* and a first yoke 2141*a*, and the driver 2142 may include a second coil 2142*b* and a second yoke 2142*a*.

Alternatively, each of the driver 2141 and the driver 2142 may also include the magnet.

Among x-axis, y-axis, and z-axis directions illustrated in FIG. 20, a z-axis may be an optical axis direction or a direction parallel to the optical axis direction, an xz-plane may be a ground surface, an x-axis may be a direction perpendicular to the z-axis on the ground surface (xz-plane), and a y-axis may be a direction perpendicular to the ground surface.

Referring to FIG. 20, the actuator 2100A according to the embodiment may include the base 2020, the first guide 2210, the second guide 2220, the first lens assembly 2110, the second lens assembly 2120, and the third lens assembly 2130A.

For example, the actuator 2100A according to the embodiment may include the base 2020, the first guide 2210 disposed at one side of the base 2020, the second guide 2220 disposed at the other side of the base 2020, the first lens assembly 2110 corresponding to the first guide 2210, the second lens assembly 2120 corresponding to the second guide 2220, a first ball 2117 (see FIG. 21A) disposed between the first guide 2210 and the first lens assembly 2110 and a second ball (not shown) disposed between the second guide 2220 and the second lens assembly 2120.

In addition, the embodiment may include the third lens assembly 2130A disposed in front of the first lens assembly 2110 in the optical axis direction.

Referring to FIGS. 19 and 20, the embodiment may include the first guide 2210 disposed close to a first sidewall of the base 2020 and the second guide 2220 disposed close to a second sidewall of the base 2020.

The first guide 2210 may be disposed between the first lens assembly 2110 and the first sidewall of the base 2020.

The second guide 2220 may be disposed between the second lens assembly 2120 and the second sidewall of the base 2020. The first sidewall and the second sidewall of the base 2020 may be disposed to face each other.

According to the embodiment, in a state in which the first guide 2210 and the second guide 2220, which are precisely numerically controlled, are coupled in the base 2020, the lens assemblies are driven, a frictional torque is reduced to reduce a frictional resistance, and thus, there are technical effects of improving a driving force, reducing power consumption, and improving a control property when zooming is performed.

Therefore, according to the embodiment, there are complex technical effects in that occurrence of decentering of the lens or tilting of the lens and occurrence of a phenomenon in which the lens group is not aligned with a central axis of the image sensor are prevented while the frictional torque is minimized so as to significantly improve image quality or resolution.

Particularly, according to the embodiment, since a guide rail is not disposed on the base, and the first guide 2210 and the second guide 2220, which are separately formed and assembled with the base 2020, are separately used, there is a particular technical effect of preventing a gradient generated due to an injection molding direction.

In the embodiment, the first guide 2210 and the second guide 2220 are injection molded in the X-axis direction, and an injection length may be shorter than a length of the base 2020, and in a case in which a rail is disposed on each of the first guide 2210 and the second guide 2220, there are technical effects in that generation of a gradient is minimized when the first guide 2210 and the second guide 2220 are injection molded and a possibility of distortion of a straight line of the rail is low.

More specifically, FIG. 21A is a perspective view illustrating the first lens assembly 2110 in the actuator according to the embodiment illustrated in FIG. 20, and FIG. 21B is a perspective view illustrating the first lens assembly 2110, illustrated in FIG. 21A from which some components are removed.

Referring briefly to FIG. 20, the embodiment may include the first lens assembly 2110 which moves along the first guide 2210 and the second lens assembly 2120 which moves along the second guide 2220.

Referring to FIG. 21A again, the first lens assembly 2110 may include a first lens barrel 2112*a*, in which a first lens 2113 is disposed, and a first driver housing 2112*b* in which a driver 2116 is disposed. The first lens barrel 2112*a* and the first driver housing 2112*b* may be a first housing, and the first housing may have a barrel or tube shape. The driver 2116 may be a magnet driver but is not limited thereto, and a coil may also be disposed in some cases.

In addition, the second lens assembly 2120 may include a second lens barrel (not shown) in which a second lens (not shown) is disposed and a second driver housing (not shown) in which a driver (not shown) is disposed. The second lens barrel (not shown) and the second driver housing (not shown) may be a second housing, and the second housing may be a barrel or tube shape. The driver may be a magnet driver but is not limited thereto, and a coil may also be disposed in some cases.

The driver 2116 may correspond to two first rails 2212.

The embodiment may be driven using one or more balls. For example, the embodiment may include the first ball 2117 disposed between the first guide 2210 and the first lens assembly 2110 and the second ball (not shown) disposed between the second guide 2220 and the second lens assembly 2120.

For example, in the embodiment, the first ball 2117 may include one or more first-1 balls 2117*a* disposed at an upper side of the first driver housing 2112*b* and one or more first-2 balls 2117*b* disposed at a lower side of the first driver housing 2112*b*.

In the embodiment, the first-1 ball 2117*a* of the first ball 2117 may move along the first-1 rail 2212*a* which is one of the first rails 2212, and the first-2 ball 2117*b* of the first ball 2117 may move along the first-2 rail 2212*b* which is another of the first rails 2212.

According to the embodiment, since the first guide includes the first-1 rail and the first-2 rail, the first-1 rail and the first-2 rail guide the first lens assembly 2110, and then, there is a technical effect of improving accuracy of alignment between the second lens assembly 2120 and the optical axis when the first lens assembly 2110 moves.

Referring to FIG. 21B, in the embodiment, the first lens assembly 2110 may include a first assembly groove 2112*b*1 in which the first ball 2117 is disposed. The second lens assembly 2120 may include a second assembly groove (not shown) in which the second ball is disposed.

The first assembly groove 2112*b*1 of the first lens assembly 2110 may be provided as a plurality of first assembly grooves 2112*b*1. In this case, based on the optical axis direction, a distance between two first assembly grooves 2112b1 among the plurality of first assembly grooves 2112b1 may be greater than a thickness of the first lens barrel 2112a.

In the embodiment, the first assembly groove 2112b1 of the first lens assembly 2110 may have a V shape. In addition, the second assembly groove (not shown) of the second lens assembly 2120 may have a V shape. The first assembly groove 2112b1 of the first lens assembly 2110 may have a U shape or a shape in contact with the first ball 2117 at two or three points instead of the V shape. The second assembly groove (not shown) of the second lens assembly 2120 may have a U shape or a shape in contact with the second ball at two or three points instead of the V shape.

Referring to FIGS. 20 and 21A, in the embodiment, the first guide 2210, the first ball 2117, and the first assembly groove 2112b1 may be disposed on a virtual line from the first sidewall toward the second sidewall. The first guide 2210, the first ball 2117, and the first assembly groove 2112b1 may be disposed between the first sidewall and the second sidewall.

Next, FIG. 22 is a perspective view illustrating the third lens assembly 2130A in the actuator according to the embodiment illustrated in FIG. 20.

Referring to FIG. 22, in the embodiment, the third lens assembly 2130A may include a third housing 2021, a third barrel 2131, and a third lens 2133.

In the embodiment, since the third lens assembly 2130A includes a barrel recess 2021r at an upper end of the third barrel 2131, there are complex technical effects in that the third barrel 2131 of the third lens assembly 2130A can be formed to have a predetermined thickness and an amount of injection can be reduced to improve accuracy of numerical management.

In addition, according to the embodiment, the third lens assembly 2130A may include a housing rib 2021a and a housing recess 2021b in the third housing 2021.

In the embodiment, there are complex technical effects in that, since the third lens assembly 2130A includes the housing recess 2021b in the third housing 2021, the amount of the injection molded product is reduced to improve numerical accuracy, and since the housing rib 2021a is provided in the third housing 2021, strength thereof can be secured.

While the present invention has been mainly described above with reference to the embodiments, it will be understood by those skilled in the art that the present invention is not limited to the embodiments, but the embodiments are only exemplary, and various modifications and applications which are not illustrated above may fall within the range of the present invention without departing from the essential features of the present embodiments. For example, components specifically described in the embodiments may be modified and implemented. In addition, it should be understood that differences related to modifications and applications fall within the scope of the present invention defined by the appended claims.

The invention claimed is:

1. An actuator control apparatus comprising:
   an actuator which changes an optical path of a lens;
   a lens support member; and
   a controller which controls the actuator,
   wherein the actuator includes a first driver and a second driver, which are disposed at a first side of the lens support member, and a third driver and a fourth driver which are disposed at a second side of the lens support member,
   wherein a first distance between the first driver and the second driver is different from a second distance between the first driver and the third driver,
   wherein the controller applies a first current to the second driver and the third driver,
   wherein the controller applies a second current to the first driver and the fourth driver, and
   wherein the controller determines a difference between an absolute value of the first current and an absolute value of the second current or magnitude of an absolute values of the first current and the second current to be applied to the drivers using at least one of the first distance, the second distance, and a tilting direction of the lens.

2. The actuator control apparatus of claim 1, wherein the first driver and the fourth driver are positioned opposite to each other in a diagonal direction,
   wherein the second driver and the third driver are positioned opposite to each other in a diagonal direction, and
   wherein when the lens moves in the diagonal direction, the controller determines that the absolute value of the first current is different from the absolute value of the second current.

3. The actuator control apparatus of claim 2, wherein, when the lens moves in an up-down direction which is a direction of the first distance or in a left-right direction which is a direction of the second distance, the controller determines that the absolute value of the first current is the same as the absolute value of the second current.

4. The actuator control apparatus of claim 3, wherein the controller determines that the absolute value of the first current when the lens is tilted in the left-right direction is greater than the absolute value of the first current when the lens is tilted in the up-down direction.

5. The actuator control apparatus of claim 1, wherein a distance between the third driver and the fourth driver is the same as the first distance, and
   wherein a distance between the second driver and the fourth driver is the same as the second distance.

6. The actuator control apparatus of claim 1, wherein the first distance is shorter than the second distance.

7. The actuator control apparatus of claim 1, wherein the first driver and the fourth driver move in different directions.

8. The actuator control apparatus of claim 1, further comprising a gyro sensor,
   wherein the actuator is an actuator for compensating for shake of the lens, and the controller generates a signal for driving the actuator using a value detected by the gyro sensor.

9. The actuator control apparatus of claim 1, wherein the actuator adjusts a focal length of the lens.

10. The actuator control apparatus of claim 1, wherein the lens support member is a shaper member which presses the lens to reversibly change a shape of the lens.

11. The actuator control apparatus of claim 1, wherein the lens support member is a lens barrel which accommodates the lens and moves with the lens.

12. The actuator control apparatus of claim 1, wherein each of the first driver, the second driver, the third driver and the fourth driver comprises a coil and a magnet.

13. The actuator control apparatus of claim 12, wherein the coil and the magnet are arranged to be spaced apart by a predetermined distance.

14. A method of compensating for camera shake, comprising:
   detecting a tilting direction of a lens;

generating a control signal for movement of the lens according to the detected tilting direction of the lens; and compensating for the tilting direction of the lens according to the control signal, wherein the compensating for of the tilting direction includes calculating current values of currents to be applied to drivers using distances between the drivers which move the lens, positions of the drivers which move the lens, and the detected tilting direction of the lens, and wherein the current values of the currents are changed according to the tilting direction of the lens.

15. The method of claim 14, wherein in a case in which the tilting direction of the lens to be compensated for is an up-down direction or left-right direction, absolute values of the currents applied to the drivers are the same.

16. The method of claim 14, wherein absolute values of the currents applied to the drivers, when the tilting direction of the lens to be compensated for is the up-down direction, are smaller than absolute values of currents applied to the drivers when the tilting direction of the lens to be compensated for is the left-right direction.

17. The method of claim 14, wherein when the tilting direction of the lens to be compensated for is a diagonal direction, absolute values of currents applied to some drivers among the drivers are different from absolute values of currents applied to the remaining drivers among the drivers.

18. The method of claim 14, wherein the generating of the signal for controlling operation of the lens for compensating for shake of the lens comprises generating a first control value to control the operation of the lens according to a degree at which an optical axis of the lens is misaligned and generating a second control value by correcting the first control value using distances and positions of the drivers which move the lens.

19. The method of claim 14, wherein the drivers comprise a first driver and a second driver, which are disposed at a first side of a lens support member, and a third driver and a fourth driver which are disposed at a second side of the lens support member, wherein a first distance between the first driver and the second driver is different from a second distance between the first driver and the third driver, wherein the first driver and the fourth driver are positioned opposite to each other in a diagonal direction, wherein a first current is applied to the second driver and the third driver, wherein a second current is applied to the first driver and the fourth driver, and wherein when the lens moves in the diagonal direction, an absolute value of the first current is different from an absolute value of the second current.

* * * * *